(12) United States Patent
Salazar et al.

(10) Patent No.: US 12,273,209 B2
(45) Date of Patent: Apr. 8, 2025

(54) POWER DISTRIBUTION OVER ETHERNET CONNECTION

(71) Applicant: Space Exploration Technologies Corp., Hawthorne, CA (US)

(72) Inventors: Joshua S. Salazar, Los Angeles, CA (US); Anno Van den Akker, Shaker Heights, OH (US); Robert Ruark, Seattle, WA (US); Yong Ren, Sammamish, WA (US); Bhaskar S. Vadathavoor, Sunnyvale, CA (US); Krisztian Bakos, Redondo Beach, CA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 0 days.

(21) Appl. No.: 18/091,748

(22) Filed: Dec. 30, 2022

(65) Prior Publication Data

US 2023/0134335 A1 May 4, 2023

Related U.S. Application Data

(63) Continuation of application No. 17/332,960, filed on May 27, 2021, now Pat. No. 11,546,179.

(60) Provisional application No. 63/032,192, filed on May 29, 2020.

(51) Int. Cl.
*H04L 12/10* (2006.01)
*H02H 9/02* (2006.01)
*H02H 9/04* (2006.01)
*H02J 3/02* (2006.01)

(52) U.S. Cl.
CPC ............... *H04L 12/10* (2013.01); *H02H 9/02* (2013.01); *H02H 9/044* (2013.01); *H02J 3/02* (2013.01)

(58) Field of Classification Search
CPC .......... H04L 12/10; H02H 9/02; H02H 9/044; H02H 9/021; H02J 3/02; H02J 1/06; Y02B 70/30
USPC .................................................. 361/117–119
See application file for complete search history.

(56) References Cited

U.S. PATENT DOCUMENTS

| | | | |
|---|---|---|---|
| 10,148,447 B1 * | 12/2018 | Rajagopal | ............... H04L 12/10 |
| 2007/0077819 A1 * | 4/2007 | Thomson | ................ H04L 12/10 |
| | | | 439/620.01 |
| 2009/0051410 A1 | 2/2009 | Hussain | |
| 2015/0035365 A1 | 2/2015 | Picard et al. | |

* cited by examiner

*Primary Examiner* — Danny Nguyen
(74) *Attorney, Agent, or Firm* — Polsinelli PC

(57) ABSTRACT

In an embodiment, a power delivery system includes a first current limiter and a second current limiter in parallel with each other, wherein a direct current (DC) voltage is provided to each of the first current limiter and the second current limiter; a first transformer electrically coupled to the first current limiter; a second transformer electrically coupled to the second current limiter; first differential signal traces electrically coupled to the first transformer; and second differential signal traces electrically coupled to the second transformer, wherein the DC voltage is transmitted from the first transformer to the first differential signal traces simultaneous with the DC voltage being transmitted to the second differential signal traces by the second transformer.

19 Claims, 8 Drawing Sheets

POWER DISTRIBUTION OVER ETHERNET CONNECTION

CROSS-REFERENCE TO RELATED APPLICATIONS

This application is a continuation of U.S. patent application Ser. No. 17/332,960, filed on May 27, 2021, entitled "POWER DISTRIBUTION OVER ETHERNET CONNECTION", which claims priority to U.S. Provisional Patent Application No. 63/032,192, filed on May 29, 2020, entitled "POWER DISTRIBUTION OVER ETHERNET CONNECTION", the contents of which are hereby incorporated by reference in their entirety and for all purposes.

BACKGROUND

Electronic devices including networking devices and/or networking-related devices can communicate with each other using twisted pairs of insulated wire, such as Ethernet cables. Ethernet cables are capable of transmitting power as well as data between devices. Cables for electronics devices supplying power or data are frequently subject to certain building codes and/or regulatory requirements. For instance, low voltage cables with individual circuits carrying more than 100 Watt (W) are subjected to more stringent building codes and/or regulatory requirements than low voltage circuits carrying less than 100 W.

Many building codes require additional restrictions and protections on low voltage circuits carrying more than 100 W of power in order to reduce the risk of fire if a cable is inadvertently shorted to ground. To safely power an electronic device requiring more than 100 W via an Ethernet cable, multiple independent low voltage circuits can be used that each draw less than 100 W. Among other things, these additional circuits require more electrical components, more expensive electrical components, and/or more complex design than for a single 100 W low voltage circuit.

BRIEF DESCRIPTION OF THE DRAWINGS

The foregoing aspects and many of the attendant advantages of the embodiments of the present disclosure will become more readily appreciated as the same become better understood by reference to the following detailed description, when taken in conjunction with the accompanying drawings, wherein.

DETAILED DESCRIPTION

Figure 1:
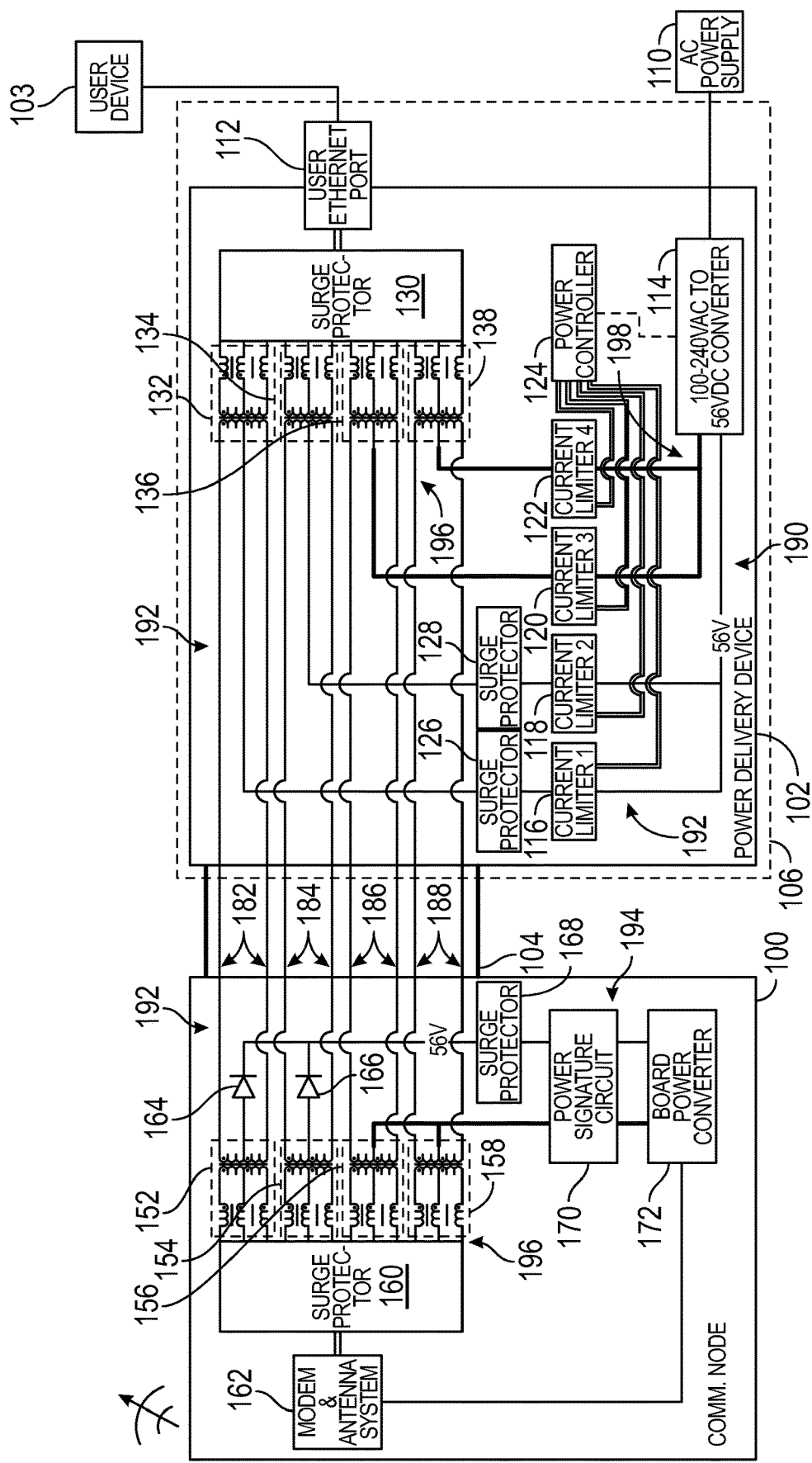
FIG. 1 is an example block diagram illustration of a communication node and associated component(s) included in a communication system in accordance with various aspects of the present disclosure.

Embodiments of apparatuses and methods relate to power delivery over an Ethernet cable to a communication node of a communication system. These and other aspects of the present disclosure will be more fully described below.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

Language such as "top surface", "bottom surface", "vertical", "horizontal", and "lateral" in the present disclosure is meant to provide orientation for the reader with reference to the drawings and is not intended to be the required orientation of the components or to impart orientation limitations into the claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Many embodiments of the technology described herein may take the form of computer- or processor-executable instructions, including routines executed by a programmable computer, processor, controller, chip, and/or the like. Those skilled in the relevant art will appreciate that the technology can be practiced on computer/controller systems other than those shown and described above. The technology can be embodied in a special-purpose computer, controller, or processor that is specifically programmed, configured or constructed to perform one or more of the computer-executable instructions described above. Accordingly, the terms "computer," "controller," "processor," or the like as generally used herein refer to any data processor and can include Internet appliances and hand-held devices (including palmtop computers, wearable computers, cellular or mobile phones, multi-processor systems, processor-based or programmable consumer electronics, network computers, mini computers, and the like). Information handled by these computers can be presented at any suitable display medium, including an organic light emitting diode (OLED) display or liquid crystal display (LCD).

Some of the issues raised above with respect to powering devices are addressed in this disclosure. It would be advantageous to configure devices to include power circuitry, Ethernet ports, and/or other electrical components defining the power path in compliance with lower voltage, low power transmission limit requirements while still capable of safely handling higher power requirements. Likewise, it would be advantageous to power higher power-requiring electronic devices over an Ethernet cable using lower power transmission compliant power circuitry. It would be advantageous for power circuitry and associated circuitry capable of transmitting and/or receiving higher power to have other benefits such as protection against adverse operating conditions. It would also be advantageous to provide a simple yet robust method to detect that an electronic device can safely receive this total power across multiple circuits. Accordingly, embodiments of the present disclosure are directed to these and other improvements in networking devices, networking-related devices, power circuitry, and/or portions thereof.

FIG. 1 is an example block diagram illustration of a communication node 100 and associated component(s) included in a communication system in accordance with various aspects of the present disclosure. Communication node 100 includes ground or terrestrial equipment configured to communicate with one or more other communication nodes included in the communication system. Communication node 100 is powered by a direct current (DC) power source 102 that is derived from an alternating current (AC) power source 110. Communication node 100 is associated with a user desirous of transmitting and receiving information using the communication system.

Communication node 100 is also referred to as a node, user terminal, user equipment, user transceiver, end terminal, and/or the like. In an embodiment, communication node 100 can include a gateway, repeater, relay, base station, and/or other communications equipment included in the communication system. The communication system can include a wireless communication system, a satellite-based communication system, a terrestrial-based communication system, a non-geostationary (NGO) satellite communication system, a low Earth orbit (LEO) satellite communication system, and/or the like.

In some embodiments, communication node 100 is located on the ground (e.g., backyard), on a building (e.g., rooftop, baloney, side of the building), near the ground (e.g., deck), and/or any location suitable to maintain a line of sight (or at least a partial line of sight) with another communication node of the communication system. For example, without limitation, in a satellite communication system, the communication node 100 can include ground equipment configured to communicate with one or more satellites of a satellite constellation orbiting Earth.

Communication node 100 is electrically coupled to a power delivery device 102 via an Ethernet cable 41104. Power delivery device 102 can be located internal to a building, structure, or enclosure 106 while communication node 100 is located internal, external, or partially external to building/structure/enclosure 106. Power delivery device 102 is also referred to as a power brick, power transformer, and/or the like. If at least a portion of the communication node 100 is located outdoors, a first portion of the Ethernet cable 104 can be located inside building/structure/enclosure 106 and a second portion of the Ethernet cable 104 different from the first portion can be located outside of building/structure/enclosure 106. Ethernet cable 104 is sufficiently shielded and weatherproofed so as to be able to withstand a variety of weather and/or external conditions.

Power delivery device 102 is configured to draw voltage from an AC power supply 110, convert the received voltage into a low DC voltage format suitable for transmitting to communication node 100, provide one or more circuit protection features to prevent damage to communication node 100, be responsive to power needs of communication node 100, and/or the like. Power delivery device 102 includes at least three ports or external connection points—a first port to electrically couple to an AC power supply 110; a second port to wired or wirelessly communicate with a user device 103, such as a user Ethernet port 112; and a third port comprising an Ethernet port to electrically couple to the Ethernet cable 104.

AC power supply 110 includes an AC voltage supply or source provided in the building/structure/enclosure 106. As an example, without limitation, AC power supply 110 includes an AC voltage wall outlet. Depending on the country or type of wall outlet, the AC voltage can range from 100 Volt (V) to 240 V AC.

User Ethernet port 112 is associated with wired or wireless communication with a user device 103. For example, the user device 103 can include a laptop or computer having a wired connection with power delivery device 102 via an Ethernet cable electrically coupled to the user Ethernet port 112. Power delivery device 102 serves as an intermediary or conduit for data communication between the user device 103 and communication node 100. Data from the user device 103 is provided to communication node 100 via power delivery device 102 and Ethernet cable 104. Communication node 100, in turn, transmits the data to another communication node of the communication system. The returned data from the another communication node (or a different communication node) is propagated in reverse order to the user device 103. As another example, the user device 103 can include a wireless router (e.g., Wifi router) and a user interfacing device such as a laptop, computer, smartphone, tablet, Internet of Things (IoT) device, etc. The wireless router has a wired connection with power delivery device 102, via user Ethernet port 112, while the user interfacing device wirelessly communicates with the wireless router. In such a scheme, data from the user interfacing device is relayed to the wireless router, user Ethernet port 112, power delivery device 102, Ethernet cable 104, then to communication node 100. The returning data from another communication node is propagated in reverse order to the user interfacing device.

Power delivery device 102 includes, but is not limited to, the user Ethernet port 112; an alternating current-direct current (AC-DC) converter 114; current limiters 116, 118, 120, 122; a power controller 124; surge protectors 126, 128, 130; and magnetics 132, 134, 136, 138. AC-DC converter 114 is (electrically) disposed between AC power supply 110, and each of current limiter 116, current limiter 118, current limiter 120, and current limiter 122. Power controller 124 electrically couples to each of current limiter 116, current limiter 118, current limiter 120, and current limiter 122. In some embodiments, power controller 124 electrically couples to AC-DC converter 114. In some embodiments, power controller 124 can be included within AC-DC converter 114. Surge protector 130 electrically couples to each of user Ethernet port 112, magnetics 132, magnetics 134, magnetics 136, and magnetics 138. Surge protector 126 is electrically disposed between magnetics 132 and current limiter 116. Surge protector 128 is electrically disposed between magnetics 134 and current limiter 118. Current limiter 120 is electrically disposed between magnetics 136 and AC-DC converter 114. Current limiter 122 is electrically disposed between magnetics 138 and AC-DC converter 114.

Ethernet cable 104 is configured to simultaneously transport data and power from the power delivery device 102 to the communication node 100, and can also transport data from the communication node 100 to the power delivery device 102. Ethernet cable 104 includes a plurality of wires or electrical conductive lines, which in combination with communication node 100 and power delivery device 102, define circuits as will be described in detail below. Because current flows in a loop in each of the defined circuits, voltage information associated with the communication node 100 is provided, along with data, to power delivery device 102 via Ethernet cable 104, which can be used for various monitoring, control, and/or protection purposes.

Communication node 100 includes, but is not limited to, magnetics 152, 154, 156, 158; surge protectors 160, 168, modem and antenna system 162, diodes 164, 166, a power signature circuit 170; and a board power converter 172. Magnetics 132 and 152 are electrically coupled to each other via twisted pair wires 182 of Ethernet cable 104. Magnetics 134 and 154 are electrically coupled to each other via twisted pair wires 184 of Ethernet cable 104. Magnetics 136 and 156 are electrically coupled to each other via twisted pair wires 186 of Ethernet cable 104. Magnetics 138 and 158 are electrically coupled to each other via twisted pair wires 188 of Ethernet cable 104. Surge protector 160 is electrically coupled to each of magnetics 152, 154, 156, 158, and modem and antenna system 162. Magnetics 152 is electrically coupled to diode 164, and diode 164, in turn, is electrically coupled to surge protector 168. Magnetics 154 is electrically coupled to diode 166, and diode 166, in turn, is electrically coupled to surge protector 168. Power signature circuit 170 electrically couples to magnetics 156 and 158. Power signature circuit 170 also electrically couples to surge protector 168. The board power converter 172 is electrically disposed between the modem and antenna system 162 and the power signature circuit 170.

Power delivery device 102 is referred to as the source side or source, and communication node 100 is referred to as the load side or load for power delivery purposes. Since the power is delivered or injected to communication node 100 from the power delivery device 102 via the Ethernet cable 104, the power delivery scheme of the present disclosure is referred to as power over Ethernet (PoE).

AC-DC converter 114 is configured to draw voltage from AC power supply 110. AC power supply 110 is configured to supply a voltage signal having a voltage between approximately 100 to 240 V AC, for example. AC-DC converter 114 is configured to draw less or equal to the maximum voltage available from AC power supply 110. In some embodiments, AC-DC converter 114 is configured to convert the voltage received from AC power supply 110 to a voltage level less or equal to the maximum voltage level permitted per circuit under regulatory requirements.

In some embodiments, power delivery device 102 can be a Class 2 compliant device, a National Electric Code (NEC) classification in the United States in which each output low voltage circuit is limited to a maximum of 100 Watt (W) if used with an AC to DC power supply or 60 V DC or lower voltage per circuit. Ethernet cable 104 also can be a Class 2 compliant device. Nevertheless, power delivery device 102 via Ethernet cable 104 is capable of delivering a maximum of 60 V DC per circuit per Class 2 compliant requirement and safely limits each circuit to 100 W maximum while still delivering a total of greater than 100 W spread out across multiple circuits. Each circuit is current limited on the power delivery (via current limiters 116, 118) and power return side (via current limiters 120, 122), and the system provides diodes 164, 166 in communication node 100 to safely limit each circuit to less than 100 W even during cable or device damage or faults.

The converted voltage outputted by AC-DC converter 114 can be 56 V DC, for example (e.g., a DC voltage less than or equal to 60 V). As used herein, references to 56 V or 56 V DC can be understood more generally to mean any DC supply voltage that complies with electrical code requirements and/or system design requirements for maximum voltage per circuit. The converted voltage can be the input to each of current limiters 116 and 118. Each of current limiter 116 (denoted as current limiter 1) and current limiter 118 (denoted as current limiter 2) is configured to limit the current associated with the converted voltage to a pre-set value, if necessary, before providing the converted voltage to respective surge protectors 126, 128. Each of surge protectors 126, 128, also referred to as a surge suppressor, is configured to suppress voltage spikes. If the inputted voltage level is above a threshold level, then the inputted voltage portion above the threshold is blocked or shorted to ground. This ensures that the voltage inputted to each of magnetics 132, 134 is the same as the converted voltage outputted by AC-DC converter 114 or is limited to 60 V DC or less per Class 2 requirements. Such voltage inputted to each of magnetics 132, 134 includes the power or power signal to be delivered to communication node 100.

In an embodiment, instead of AC-DC converter 114 providing a voltage signal at a desired voltage, current limiters 116, 118 and/or surge protectors 126, 128 are configured to transform the voltage signal outputted from AC-DC converter 114 into the desired voltage to each of the magnetics 132, 134. Each of current limiters 116, 118 can be configured to output a particular current associated with the desired voltage, based on control signals from power controller 124. Surge protectors 126, 128 can act as a final check of the desired voltage being provided to each of magnetics 132, 134 for transmission to communication node 100.

Surge protector 130 also includes a surge suppressor configured to protect against voltage spikes. In the present disclosure, surge protector 130 is configured to protect against potential high voltages associated with the data signal received from the user device 103 via user Ethernet port 112.

The Ethernet data signals are transmitted using twisted pair wires or lines. Power is delivered by applying a common DC bias voltage to both wires/lines of the twisted pair. Accordingly, the power delivery technique described with respect to FIG. 1 can be referred to as common mode power delivery. This allows the data transmission to ride on top of the DC bias voltage. Each magnetics 132, 134, 136, 138,

152, 154, 156, 158 includes a transformer in series with a common mode choke. The transformer is configured to apply or remove the applied DC voltage while the common mode choke is configured to attenuate noise associated with the Ethernet data signals. Transformers included in magnetics 132, 134, 156, and 158 apply the DC bias voltage to respective twisted pair wires. The DC bias voltage can be input into the center tap of the transformers included in magnetics 132, 134, 156, and 158. Transformers included in magnetics 152, 154, 136, and 138 separate the DC bias voltage from the data signals. In communication node 100, DC bias voltage separated or extracted by transformers are sent to board power converter 172 to power the communication node 100 while the data signals are sent to modem and antenna system 162. Data signals can be sent to user Ethernet port 112 from node 100 to communicate between devices. Each of magnetics 132, 134, 136, 138, 152, 154, 156, 158 is also referred to as Ethernet magnetics. Ethernet cable 104 includes at least four (electrically conductive) twisted pairs of wires/lines 182, 184, 186, 188 (also referred to as twisted pair wires/lines) electrically coupled to respective magnetics 132, 134, 136, 138 at one end and respective magnetics 152, 154, 156, 158 at the opposite end. A first signal path is thus defined by magnetics 132, first twisted pair wires 182, and magnetics 152. A first transmission signal traverses the first signal path to be received by magnetics 152. A second signal path is defined by magnetics 134, second twisted pair wires 184, and magnetics 154. A second transmission signal traverses the second signal path to be received by magnetics 154. A third signal path is defined by magnetics 156, third twisted pair wires 186, and magnetics 136. A fourth signal path is defined by magnetics 158, fourth twisted pair wires 188, and magnetics 138. The third and fourth signal paths include part of return signal paths to complete the circuits. First, second, third, and fourth signal paths are parallel to each other.

First transmission signal received by magnetics 152 is processed to separate the data from the power. The data, carried on a signal having a certain voltage, is provided as an input to surge protector 160. Surge protector 160 is similar to surge protector 130 in that surge protector 160 is configured to suppress incoming voltage above a threshold. Surge protector 160 is configured to output the data to modem and antenna system 162 at a safe signal level. Second transmission signal received by magnetics 154 is similarly processed, with its associated data inputted to surge protector 160, data voltage level limited as necessary, and outputted to modem and antenna system 162.

Modem and antenna system 162 is configured to process the data signals appropriate for transmission to another communication node of the communication system. Modem and antenna system 162 includes, but is not limited to, one or more modem, antenna, processor, transmitter, receiver, integrated circuit (IC) chips, transmission associated circuitry, receiving associated circuitry, and/or the like.

The power portion of the first transmission signal at magnetics 152 can be the input to diode 164. Diode 164 is configured to isolate external cable or device faults or damage that can short multiple circuits together. This diode prevents current from flowing backwards and ensures that the total power on a single circuit does not exceed 100 W. Without diode 164, current from a first circuit can flow backwards onto a second circuit if the second circuit is inadvertently shorted in Ethernet cable 104. The current limiters (e.g., current limiters 116, 118, 120, and/or 122) can still each detect less than 100 W but one of the twisted pair lines can have a combined power above 100 W by drawing from a first circuit from power delivery device 102 and a second circuit that comes from node 100. With inclusion of diode 164, a shorted circuit can only draw power from power delivery device 102 and the current limiters properly limit the circuit even in a faulted condition. The output of diode 164 can be a voltage signal close to 56 V DC, a slightly lower voltage level than nominally injected to current limiter 116 and the first signal path. For example, the output of the diode 164 can be within 0 V-1.5 V of the voltage level nominally injected to current limiter 116.

The power portion of the second transmission signal at magnetics 154 can be the input to diode 166. Diode 166 is similar to diode 164. The output of diode 166 also can be a voltage signal slightly lower than 56 V DC. For example, the output of the diode 166 can be within 5% of the voltage level nominally injected to current limiter 118. The voltage signals are combined together at the outputs of diodes 164, 166, to a combined voltage signal still at slightly below 56 V (taking into account cable power losses and diode power losses) or approximately equal to (nominal) 56 V. Communication node 100 can now draw power from two circuits simultaneously to use more than 100 W in total while the individual circuits in the Ethernet cable 104 are safely limited to less than 100 W.

The combined voltage signal can be input to surge protector 168 to suppress any voltage in excess of a pre-set threshold value. Surge protector 168 is configured to clamp voltage surges at a level just below the safe operating limit of the downstream components (e.g., power signature circuit 170 and/or board power converter 172) to protect them against transients or faults. The voltage signal outputted by surge protector 168 is the input to power signature circuit 170.

Power signature circuit 170 is configured to signal to power delivery device 102 that it is safe to apply the DC supply voltage to node 100. The DC supply voltage can be any voltage that complies with relevant Some Ethernet devices cannot handle 56 V applied to the twisted pairs. In some embodiments, power controller 124 included in power delivery device 102 first applies a first voltage through a high resistance. The first voltage can be 3 V, 5 V, 5.5 V or any voltage that can be safely applied to Ethernet devices that cannot handle a high DC voltage applied to the twisted pairs. In response, power signature circuit 170 applies that equivalent high resistance to ground to signal to power controller 124 that it acknowledges the request to send power and that node 100 is capable of receiving the full 56 V. The high resistance is chosen so that if the Ethernet cable 104 is (electrically) shorted, it will draw a minimal current from current limiters 116 and 118 and not pose any harm. If node 100 is a device not capable of receiving higher power, the high resistance also protects the device from damage since the voltage and current levels are so low that it cannot damage the device if it inadvertently draws current.

Power controller 124 then looks to see if the first voltage (e.g., 5 V) output after the high resistance is dropped in half (e.g., to about 2.5 V) or some other pre-set portion (e.g., one third, two thirds, etc.) of the first voltage applied through the high resistance by power controller 124. This signals to power controller 124 that the other side (e.g., node 100) applied the proper high resistance value and that the Ethernet cable 104 is not shorted. If the full first voltage is still detected, then power controller 124 knows that there is no device electrically connected at the other end of Ethernet cable 104 and not to send power. If the voltage is less than the pre-set portion of the first voltage, power controller 124 knows that there is a wiring short or that node 100 is not capable of receiving power. If, however, the pre-set portion of the first voltage is detected within some tolerance, power controller 124 can safely supply 56 V by enabling current limiters 116 and 118. In this manner, a detection technique for safely providing power to a load device is implemented using a simple circuit without a controller (e.g., power signature circuit 170) in node 100. The need for a complicated controller in the load device and/or numerous communication between load and source devices is obviated.

The combined approximately 56 V is provided to board power converter 172 to properly allocate and distribute power to various components included in node 100. For example, modem and antenna system 162 is powered by power received from board power converter 172. Each subcomponent of modem and antenna system 162 can have different power requirements from each other and the power requirement for a given subcomponent can vary as a function of time (e.g., a subcomponent is enabled or disabled at different points in time).

A circuit forms a closed loop and accordingly, the start of the return signal path is defined by the board power converter 172 to power signature circuit 170, and then toward magnetics 156 and 158. The return or output voltage signal splits into each of magnetics 156, 158 to be received by magnetics 136, 138, respectively, via third and fourth lines, 186, 188, respectively. Magnetics 136, 138, in turn, provide return voltages to respective current limiters 120, 122. The outputs of current limiters 120, 122 are combined to be an input to AC-DC converter 114.

The circuits formed by communication node 100, Ethernet cable 104, and power delivery device 102 have single and dual signal paths at different portions. At a first portion 190 of the circuits, starting with the AC-DC converter 114, a single signal path is defined (e.g., a single voltage signal at 56 V DC outputted by AC-DC converter 114 to each of current limiters 116, 118). At a second portion 192 of the circuits, starting with current limiters 116, 118, dual or parallel signal paths are defined. The two signal paths continue with magnetics 132, 134 and to magnetics 152, 154, respectively. At a third portion 194 of the circuits, starting with the surge protector 168 to power signature circuit 170 to board power converter 172 and then back to power signature circuit 170, a single signal path is defined. At a fourth portion 196 of the circuits, starting with magnetics 156, 158 to current limiters 120, 122, dual or parallel signal paths are defined. At a fifth portion 198 of the circuits, the outputs of current limiters 120, 122 are combined into a single signal path to AC-DC converter 114.

In some embodiments, a first circuit is defined from the output of current limiter 116 to diode 164 and the associated return path to power delivery device 102, which is a current path of a single circuit of less than 100 W. A second circuit is defined from the output of current limiter 118 to diode 166 and the associated return path to power delivery device 102, which is a current path of another single circuit of less than 100 W. Thus, two circuits, each carrying less than 100 W, supplies a total of more than 100 W to communication node 100.

Because total power to communication node 100 is delivered on two signal paths/lines/circuits (via first and second twisted pair wires 182, 184 of Ethernet cable 104) from power delivery device 102, more than 100 W can be safely delivered to the load (communication node 100) while staying in compliance with the maximum allowed power and DC voltage levels per delivery signal path/line/circuit. This means that the circuitry in communication node 100, power delivery device 102, or Ethernet cable 104 is not subject to higher regulatory requirements, such as regulatory requirements associated with power delivery greater than 100 W via a single power delivery path/line/circuit between source and load.

In some embodiments, prior to start of full power delivery as described above, a check is performed by load detection circuitry as to whether an appropriate communication node, such as communication node 100, is present and properly connected to power delivery device 102. Load detection circuitry can be included in AC-DC converter 114 or comprise a separate component electrically disposed between AC-DC converter 114 and current limiters 116, 118. Load detection circuitry can also be referred to as handshaking circuitry.

Load detection circuitry is configured to apply a small resistance to the circuit (e.g., add a 1 kiloOhm (kΩ) resistance) just prior to start of second portion 192. A particular (small) voltage (e.g., 3.3V, 5 V, 5.5 V or any other suitable small voltage) is outputted by AC-DC converter 114 as the detection input voltage. The value of the detection return or output voltage, in response to the detection input voltage, is measured or detected. If the detection return or output voltage is a particular value (e.g., approximately 2.5 V DC), such voltage value is indicative of the communication node 100 present and properly connected to the power delivery device 102. The values of the detection input voltage and the detection output voltage are selected relative to each other given the particular applied resistance. Such handshake procedure is facilitated by power signature circuit 170 and power controller 124 as described above.

Upon detection of the communication node 100, the applied resistance is disabled or removed from the circuit for full or normal power delivery using 56 V DC output by AC-DC converter 114.

In some embodiments, AC-DC converter 114 may output 56 V DC (or some other voltage) and power controller 124 is configured to generate command signals regarding operation of current limiters 116, 118. In response, current limiters 116, 118 limit the output currents to a particular value, the particular value selected with the expectation of the detection return voltage being approximately 2.5 V DC if communication node 100 is properly connected.

If the detection return voltage is zero, then the load side is shorted out and it is deemed unsafe to apply the 56 V. The applied resistance limits the current so that the circuit can safely stay in the shorted state indefinitely, if necessary. If the detection return voltage is a particular value higher than the value indicative of proper connection with communication node 100 (typically higher than the approximately 2.5 V DC such as 5 V DC), then the device at the other end can be an incompatible device and the 56 V is not applied. If the detection return voltage is nominally 2.5V DC, the 2.5 V DC detected is associated with an appropriate resistor included in the load side and a safe condition to apply 56 V.

Power controller 124 is configured to control current limiters 116, 118, 120, 122. Current limiters 116, 118, 120, 122 can communicate with power controller 124, such as providing detected current values to power controller 124 to protect against faults. As an example, if power controller 124 determines power greater than 100 W per circuit, based on detected current in one or more of current limiters 116, 118, 120, 122, power controller 124 is configured to send control signals to current limiters 116 and 118 (or current limiters 120 and 122). The control signals configure current limiters 116 and 118 (or current limiters 120 and 122) to be disabled or turned off so as to shut off power from being delivered by the circuit. The power shut off protects against faults and so that the power delivery device 102 will still be Class 2 compliant.

If the voltage drops too low, power shut off can also occur, since this condition is indicative of the Ethernet cable 104 dissipating too much power. The power may be shut off to protect the Ethernet cable 104 from damage or further damage.

Although the example block diagram of FIG. 1 describes a DC supply voltage (e.g., 56V) generated by an AC-DC converter with an AC power supply 110 as an input, it should be understood that the DC supply voltage can also be generated by a DC-DC converter (not shown) included within the power delivery device 102 with a DC power supply (e.g., as an alternative to AC power supply 110) as an input without departing from the scope of the present disclosure. In some implementations, the power delivery device 102 may not include a AC-DC converter or DC-DC converter, and the DC supply voltage can be provided to the power delivery device 102 from an external DC power supply.

FIG. 402 illustrates at least a portion of a circuit showing details of magnetics 132, 134, 136, 138 in accordance with various aspects of the present disclosure. Each of magnetics 132, 134, 136, 138 includes high current magnetics. Magnetics 132 includes a transformer 200 electrically coupled to a common mode choke 202. The DC voltage (e.g., 56 V) from the surge protector 116 is input into the center tap of transformer 200. Common mode choke 202 electrically couples to a capacitor 204, and then terminates to ground. Transformer 200 includes a transformer having primary windings to secondary windings at a 1:1 ratio. Transformer 200 can include any of the following types of transformer, without limitation, wire coiled on ferrite cores, copper traces wrapped with a ferrite core, and/or the like.

Common mode choke 202 is configured to filter out or attenuate noise from the data signals. Common mode choke 202 is located on the physical (PHY) side or the side of the transformer 200 furthest from the line side (e.g., first twisted pair wires 182). Common mode choke 202 is located between the data side (from user Ethernet port 112) and transformer 200, rather than between transformer 200 and the line side (first twisted pair wires 182). Thus, magnetics 132 is also referred to as reverse magnetics or reverse configured magnetics.

Transformer 200 includes a transformer having primary windings to secondary windings at a 1:1 ratio. Transformer 200 can include any of the following types of transformer, without limitation, wire coiled on ferrite cores, copper traces wrapped with a ferrite core, and/or the like.

Each of the remaining magnetics 134, 136, 138 and associated components is similar to magnetics 132 and associated components discussed above, except associated with respective second, third, and fourth twisted pair wires 184, 186, 188. Unlike for magnetics 152, 154, there are no bridge diodes (such as diodes 164, 166) associated with magnetics 132, 134. The configuration of magnetics 132, 134, 136, 138 provides lightning protection.

Capacitors C1 (204), C2, C3, and/or C4 can be optional depending on the bias of the respective pair line, in some embodiments.

Figure 3:
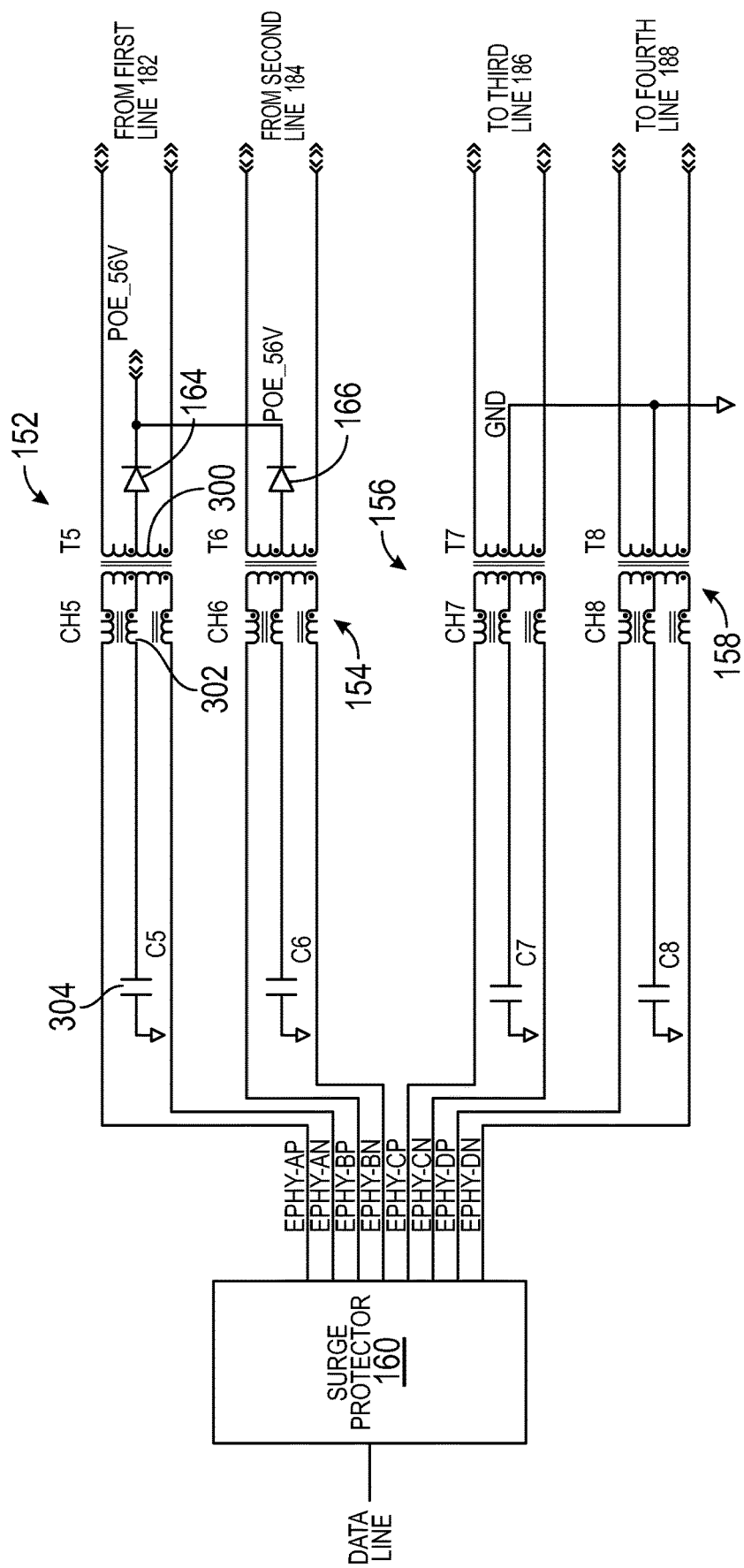
FIG. 3 illustrates at least a portion of a circuit showing details of magnetics included in the communication node shown in FIG. 1 in accordance with various aspects of the present disclosure.

FIG. 3 illustrates at least a portion of a circuit showing details of magnetics 152, 154, 156, 158 in accordance with various aspects of the present disclosure. Each of magnetics 152, 154, 156, 158 includes high current magnetics. Magnetics 152 includes a transformer 300 electrically coupled to a common mode choke 302. Common mode choke 302 is configured to filter out or attenuate noise of the data signal. Common mode choke 302 is located on the PHY side or the side of the transformer 300 furthest from the line side (e.g., first twisted pair wires 182). Common mode choke 302 is located between the data side (to modem and antenna system 162) and transformer 300, rather than between transformer 300 and the line side (first twisted pair wires 182). Thus, magnetics 152 is also referred to as reverse magnetics or reverse configured magnetics.

A DC voltage (e.g., 56 V) can be output from the center tap of transformer 300. Transformer 300 can be a transformer having primary windings to secondary windings at a 1:1 ratio. Transformer 300 can include any of the following types of transformer, without limitation, wire coiled on ferrite cores, copper traces wrapped with a ferrite core, and/or the like.

Each of the remaining magnetics 154, 156, 158 and associated components is similar to magnetic 152 and associated components discussed above, except associated with respective second, third, and fourth twisted pair wires 184, 186, 188. Magnetics 132, 134, 136, 138 and associated components are also similar to respective magnetics 152, 154, 156, 158. Magnetics 132, 134, 136, 138 and associated components are mirrored or symmetrical about an imaginary plane into the page in FIG. 1 with respect to magnetics 152, 154, 156, 158. Capacitors C5 (304), C6, C7, and/or C8 can be optional depending on the bias of the respective pair line, in some embodiments.

In this manner, more than 100 W can be safely delivered to a load from an AC to DC power source. While conventional power over Ethernet is limited to 100 W due to regulatory requirements (e.g., Class 2 compliant power delivery). For delivering more than 100 W, different cabling requirement and/or circuit requirements are applicable. In the present disclosure, a total of more than 100 W is delivered by splitting the power into two individually current limited and protected circuits or lines from the source to the load (e.g., at least a portion of the circuit includes dual or parallel signal paths/lines). Such implementation permits the source to use lower power circuit (portions) that comply with the regulatory limit of 60 V DC and 100 W per circuit.

Figure 4A:
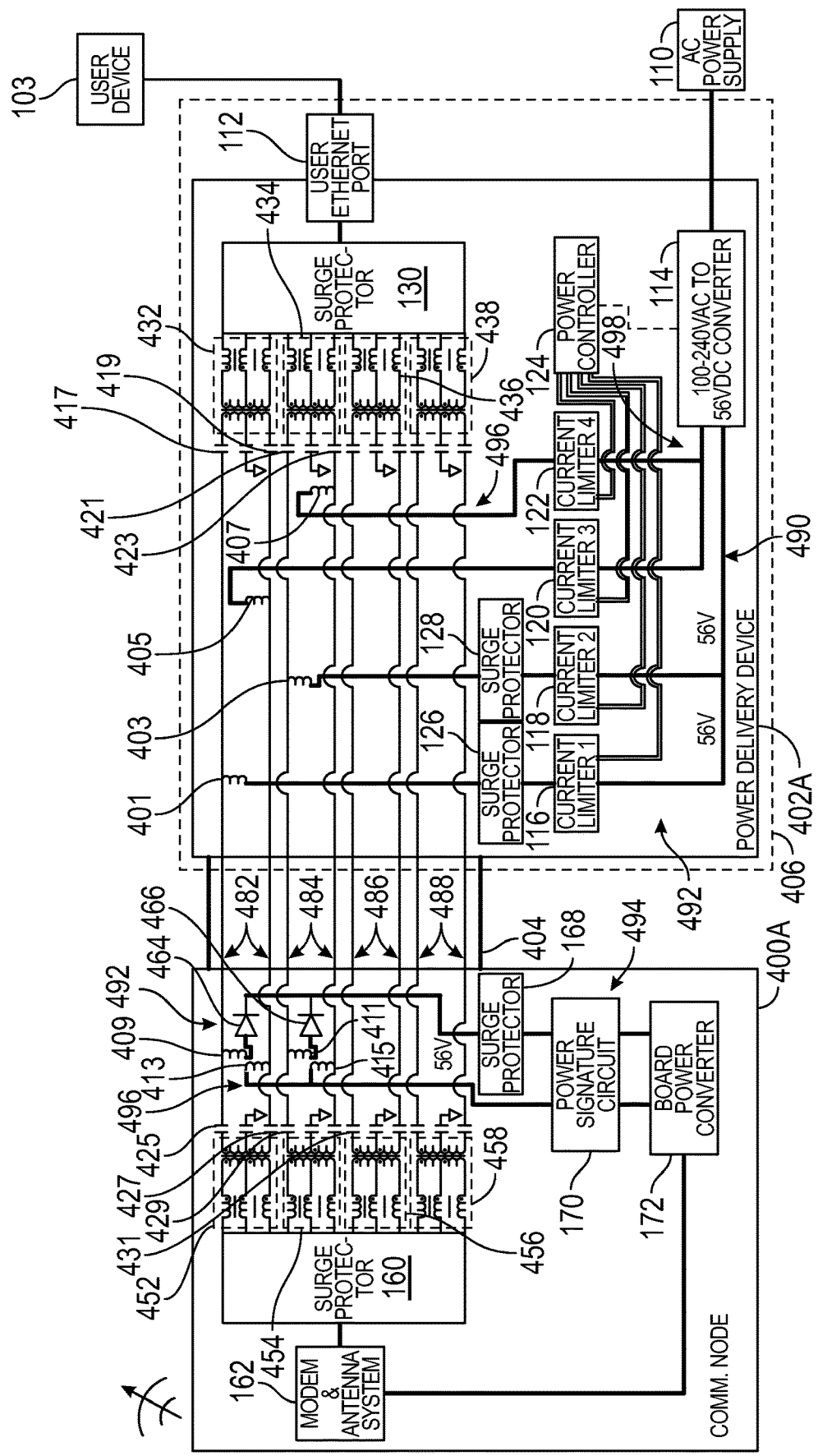
FIG. 4A is an example block diagram illustration of a communication node and associated component(s) included in a communication system in accordance with various aspects of the present disclosure.

FIG. 4A is an example block diagram illustration of a communication node 400A and associated component(s) included in a communication system in accordance with various aspects of the present disclosure. Communication node 400A is similar to and performs similar functionality to communication node 100 shown in FIG. 1. Components with like identifiers in FIG. 1 and FIG. 4A correspond and perform similar functionality. FIG. 4A illustrates an additional configuration for delivering DC power to the communication node 400A as will be described in more detail below.

Communication node 400A includes ground or terrestrial equipment configured to communicate with one or more other communication nodes included in the communication system. Communication node 400A is powered by a direct current (DC) power source that is derived from an alternating current (AC) power source. Communication node 400A is associated with a user desirous of transmitting and receiving information using the communication system.

Communication node 400A is also referred to as a node, user terminal, user equipment, user transceiver, end terminal, and/or the like. In an embodiment, communication node 400A can include a gateway, repeater, relay, base station, and/or other communications equipment included in the communication system. The communication system can include a wireless communication system, a satellite-based communication system, a terrestrial-based communication system, a non-geostationary (NGO) satellite communication system, a low Earth orbit (LEO) satellite communication system, and/or the like.

In some embodiments, communication node 400A is located on the ground (e.g., backyard), on a building (e.g., rooftop, baloney, side of the building), near the ground (e.g., deck), and/or any location suitable to maintain a line of sight (or at least a partial line of sight) with another communication node of the communication system. For example, without limitation, in a satellite communication system, the communication node 400A can include ground equipment configured to communicate with one or more satellites of a satellite constellation orbiting Earth.

Communication node 400A is electrically coupled to a power delivery device 402A via an Ethernet cable 404. Power delivery device 402A can be located internal to a building, structure, or enclosure 406 while communication node 400A is located internal, external, or partially external to building/structure/enclosure 406. Power delivery device 402A is also referred to as a power brick, power transformer, and/or the like. If at least a portion of the communication node 400A is located outdoors, a first portion of the Ethernet cable 404 can be located inside building/structure/enclosure 406 and a second portion of the Ethernet cable 404 different from the first portion can be located outside of building/structure/enclosure 406. Ethernet cable 404 is sufficiently shielded and weatherproofed so as to be able to withstand a variety of weather and/or external conditions.

Power delivery device 402A is configured to draw voltage from an AC power supply 110, convert the received voltage into a low DC voltage format suitable for transmitting to communication node 400A, provide one or more circuit protection features to prevent damage to communication node 400A, be responsive to power needs of communication node 100, and/or the like. Power delivery device 102 includes at least three ports or external connection points—a first port to electrically couple to an AC power supply 110; a second port to wired or wirelessly communicate with a user device 103, such as a user Ethernet port 112; and a third port comprising an Ethernet port to electrically couple to the Ethernet cable 104.

AC power supply 110 includes an AC voltage supply or source provided in the building/structure/enclosure 406. As an example, without limitation, AC power supply 110 includes an AC voltage wall outlet. Depending on the country or type of wall outlet, the AC voltage can range from 100 Volt (V) to 240 V AC.

User Ethernet port 112 is associated with wired or wireless communication with a user device 103. For example, the user device 103 can include a laptop or computer having a wired connection with power delivery device 402A via an Ethernet cable electrically coupled to the user Ethernet port 112. Power delivery device 402A serves as an intermediary or conduit for data communication between the user device 103 and communication node 400A. Data from the user device 103 is provided to communication node 400A via power delivery device 402A and Ethernet cable 404. Communication node 400A, in turn, transmits the data to another communication node of the communication system. The returned data from the another communication node (or a different communication node) is propagated in reverse order to the user device 103. As another example, the user device 103 can include a wireless router (e.g., Wifi router) and a user interfacing device such as a laptop, computer, smartphone, tablet, Internet of Things (IoT) device, etc. The wireless router has a wired connection with power delivery device 402A, via user Ethernet port 112, while the user interfacing device wirelessly communicates with the wireless router. In such a scheme, data from the user interfacing device is relayed to the wireless router, user Ethernet port 112, power delivery device 402A, Ethernet cable 404, then to communication node 400A. The returning data from another communication node is propagated in reverse order to the user interfacing device.

Power delivery device 402A includes, but is not limited to, the user Ethernet port 112; an alternating current-direct current (AC-DC) converter 114; current limiters 116, 118, 120, 122; a power controller 124; surge protectors 126, 128, 130; magnetics 432, 434, 436, 438, inductors 401, 403, 405, 407, and DC isolation capacitors 417, 419, 421, 423. AC-DC converter 114 is (electrically) disposed between AC power supply 110, and each of current limiter 116, current limiter 118, current limiter 120, and current limiter 122. Power controller 124 electrically couples to each of current limiter 116, current limiter 118, current limiter 120, and current limiter 122. In some embodiments, power controller 124 electrically couples to AC-DC converter 114. In some embodiments, power controller 124 can be included within AC-DC converter 114. Surge protector 130 electrically couples to each of user Ethernet port 112, magnetics 432, magnetics 434, magnetics 436, and magnetics 438. Surge protector 126 is electrically disposed between inductor 401 and current limiter 116. Inductor 401 is electrically coupled to a first wire of twisted pair wires 482 of Ethernet cable 404. DC isolation capacitor 417 is electrical disposed between the first wire of twisted pair wires 482 and magnetics 432. Surge protector 128 is electrically disposed between inductor 403 and current limiter 118. Inductor 403 is electrically coupled to a first wire of twisted pair wires 484 of Ethernet cable 404. DC isolation capacitor 419 is electrical disposed between the first wire of twisted pair wires 484 and magnetics 434. Current limiter 120 is electrically disposed between inductor 405 and AC-DC converter 114. Inductor 405 is electrically coupled to a second wire of twisted pair wires 482 of Ethernet cable 404. DC isolation capacitor 421 is electrical disposed between the second wire of twisted pair wires 482 and magnetics 432. Current limiter 122 is electrically disposed between inductor 407 and AC-DC converter 114. Inductor 407 is electrically coupled to a second wire of twisted pair wires 484 of Ethernet cable 404. DC isolation capacitor 423 is electrical disposed between the second wire of twisted pair wires 484 and magnetics 434.

Ethernet cable 404 is configured to simultaneously transport data and power from the power delivery device 402A to the communication node 400A, and can also transport data from the communication node 400A to the power delivery device 402A. Ethernet cable 404 includes a plurality of wires or electrical conductive lines, which in combination with communication node 400A and power delivery device 402A, define circuits as will be described in detail below. Because current flows in a loop in each of the defined circuits, voltage information associated with the communication node 400A is provided, along with data, to power delivery device 402A via Ethernet cable 404, which can be used for various monitoring, control, and/or protection purposes.

Communication node 400A includes, but is not limited to, magnetics 452, 454, 456, 458; surge protectors 160, 168; modem and antenna system 162; diodes 464, 466, inductors 409, 411, 413, 415, DC isolation capacitors 425, 427, 429, 431, a power signature circuit 170, and a board power converter 172. DC isolation capacitors 425 and 427 are electrical disposed between Magnetics 452 and first and second wires, respectively, of twisted pair wires 482 of Ethernet cable 404. DC isolation capacitors 429 and 431 are electrical disposed between magnetics 454 and first and second wires, respectively, of twisted pair wires 484 of Ethernet cable 404. Magnetics 436 and 456 are electrically AC coupled to each other via twisted pair wires 486 of Ethernet cable 404. Magnetics 438 and 458 are electrically AC coupled to each other via twisted pair wires 488 of Ethernet cable 404. Surge protector 160 is electrically coupled to each of magnetics 452, 454, 456, 458, and modem and antenna system 162. Inductor 409 is electrically coupled between diode 464 and the first wire of twisted pair wires 482, and diode 464, in turn, is electrically coupled to surge protector 168. Inductor 411 is electrically coupled between diode 466 and the first wire of twisted pair wires 484, and diode 466, in turn, is electrically coupled to surge protector 168. Inductor 413 is electrically coupled to the second wire of twisted pair wires 482. Inductor 415 is electrically coupled to the second wire of twisted pair wires 484. Power signature circuit 170 electrically couples to inductors 413 and 415. Power signature circuit 170 also electrically couples to surge protector 168. The board power converter 172 is electrically disposed between the modem and antenna system 162 and the power signature circuit 170.

AC-DC converter 114 is configured to draw voltage from AC power supply 110. AC power supply 110 is configured to supply a voltage signal having a voltage between approximately 100 to 240 V AC, for example. AC-DC converter 114 is configured to draw less or equal to the maximum voltage available from AC power supply 110. In some embodiments, AC-DC converter 114 is configured to convert the voltage received from AC power supply 110 to a voltage level less or equal to the maximum voltage level permitted per circuit under regulatory requirements.

In some embodiments, power delivery device 402A can be a Class 2 compliant device, a NEC classification in the United States in which each output low voltage circuit is limited to a maximum of 100 Watt (W) if used with an AC to DC power supply or 60 V DC or lower voltage per circuit. Ethernet cable 404 also can be a Class 2 compliant device. Nevertheless, power delivery device 402A via Ethernet cable 404 is capable of delivering a maximum of 60 V DC per circuit per Class 2 compliant requirement and safely limits each circuit to 100 W maximum while still delivering a total of greater than 100 W spread out across multiple circuits. Each circuit is current limited on the power delivery (via current limiters 116, 118) and power return side (via current limiters 120, 122), and the system provides diodes 464, 466 in communication node 400A to safely limit each circuit to less than 100 W even during cable or device damage or faults.

The converted voltage outputted by AC-DC converter 114 can be 56 V DC, for example (e.g., a DC voltage less than or equal to 60 V). The converted voltage can be the input to each of current limiters 116 and 118. Each of current limiter 116 (denoted as current limiter 1) and current limiter 118 (denoted as current limiter 2) is configured to limit the current associated with the converted voltage to a pre-set value, if necessary, before providing the converted voltage to respective surge protectors 126, 128. Each of surge protectors 126, 128, also referred to as a surge suppressor, is configured to suppress voltage spikes. If the inputted voltage level is above a threshold level, then the inputted voltage portion above the threshold is blocked or shorted to ground. This ensures that the voltage inputted to each of inductors 401, 403 is the same as the converted voltage outputted by AC-DC converter 114 or is limited to 60 V DC or less per Class 2 requirements. Such voltage inputted to each of inductors 401, 403 comprise the power or power signal to be delivered to communication node 100.

In an embodiment, instead of AC-DC converter 114 providing a voltage signal at a desired voltage, current limiters 116, 118 and/or surge protectors 126, 128 are configured to transform the voltage signal outputted from AC-DC converter 114 into the desired voltage to each of the inductors 401, 403. Each of current limiters 116, 118 can be configured to output a particular current associated with the desired voltage, based on control signals from power controller 124. In some embodiments, power controller 124 can be included in and/or provide control signals (not shown) to the AC-DC converter 114. Surge protectors 126, 128 can act as a final check of the desired voltage being provided to each of inductors 401, 403 for transmission to communication node 100.

Surge protector 130 also includes a surge suppressor (not shown) configured to protect against voltage spikes. In the present disclosure, surge protector 130 is configured to protect against potential high voltages associated with the data signal received from the user device 103 via user Ethernet port 112.

The Ethernet data signals are transmitted using twisted pair wires or lines. Power is delivered by applying a differential DC bias voltage across wires/lines of the twisted pair. The data transmission rides on top of the differential DC bias voltage applied to each wire/line of the twisted pair. Accordingly, the power delivery technique described with respect to FIG. 4A is referred to as differential power delivery. The inductors 401, 403, 405, 407 apply the differential DC bias voltage to respective twisted pair wires. DC isolation capacitors 417, 419 isolate the magnetics 432 from the applied differential DC bias voltage. Similarly, DC isolation capacitors 421, 423 isolate the magnetics 434 from the applied differential DC bias voltage. Inductors 409, 411, 413, 415 are used to separate the differential DC bias voltage from respective twisted pair wires. DC isolation capacitors 425, 427, isolate the magnetics 452 from the applied differential DC bias voltage. Similarly, DC isolation capacitors 429, 431 isolate the magnetics 454 from the applied differential DC bias voltage. In communication node 400A, DC bias voltage separated or extracted by inductors 409, 411, 413, 415 are sent to board power converter 172 to power the communication node 400A while the data signals are sent to modem and antenna system 162. Data signals can be sent to user Ethernet port 112 from communication node 400A to communicate between devices.

Each magnetics 432, 434, 436, 438, 452, 454, 456, 458 includes a transformer in series with a common mode choke. The transformer is configured to apply or remove the applied DC voltage while the common mode choke is configured to attenuate noise associated with the Ethernet data signals. Each of magnetics 432, 434, 436, 438, 452, 454, 456, 458 is also referred to as Ethernet magnetics.

Ethernet cable 404 includes at least four (electrically conductive) twisted pairs wires/lines 482, 484, 486, 488 electrically AC coupled to respective magnetics 432, 434, 436, 438 at one end and respective magnetics 452, 454, 456, 458 at the opposite end. A first AC signal path is thus defined by magnetics 432, first twisted pair wires 482, and magnetics 452. A first transmission signal traverses the first AC signal path to be received by magnetics 452. Simultaneously, first and second wires of the first twisted pair 482 act as portions of a signal path and return path, respectively, for a first DC power circuit. A second AC signal path is defined by magnetics 434, second twisted pair wires 484, and magnetics 454. A second transmission signal traverses the second signal path to be received by magnetics 454. Simultaneously, first and second wires of the second twisted pair 484 act as portions of a signal path and return path, respectively, for a second DC power circuit. A third AC signal path is defined by magnetics 456, third twisted pair wires 486, and magnetics 436. A fourth AC signal path is defined by magnetics 458, fourth twisted pair wires 488, and magnetics 438. First, second, third, and fourth signal paths are parallel to each other. In the illustrated configuration, the third and fourth twisted pair wires 486, 488 do not include a simultaneous DC signal path and return path for DC power circuits. However, it should be understood that additional DC power circuits can be provided on the third and/or fourth twisted pair wires 486, 488 in a similar fashion to the first and second DC power circuits described with respect to FIG. 4A.

Data contained in the first transmission signal received by magnetics 452 is carried on a signal having a certain voltage and provided as an input to surge protector 160. Surge protector 160 is similar to surge protector 130 in that surge protector 160 is configured to suppress incoming voltage above a threshold. Surge protector 160 is configured to output the data to modem and antenna system 162 at a safe signal level. Data contained in the second transmission signal received by magnetics 454 is similarly processed, with its associated data inputted to surge protector 160, data voltage level limited as necessary, and outputted to modem and antenna system 162.

Modem and antenna system 162 is configured to process the data signals appropriate for transmission to another communication node of the communication system. Modem and antenna system 162 includes, but is not limited to, one or more modem, antenna, processor, transmitter, receiver, integrated circuit (IC) chips, transmission associated circuitry, receiving associated circuitry, and/or the like.

The power portion for the first DC power circuit at inductor 409 can be the input to diode 464. Diode 464 is configured to isolate external cable or device faults or damage that can short multiple circuits together. This diode prevents current from flowing backwards and ensures that the total power on a single circuit does not exceed 100 W. Without diode 464, current from the first DC power circuit can flow backwards onto a second circuit if the second circuit is inadvertently shorted in Ethernet cable 404. The current limiters (e.g., current limiters 116, 118, 120, and/or 122) can still each detect less than 100 W but one of the twisted pair lines can have a combined power above 100 W by drawing from a first circuit from power delivery device 402A and a second circuit that comes from node 100. With inclusion of diode 464, a shorted circuit can only draw power from power delivery device 402A and the current limiters properly limit the circuit even in a faulted condition. The output of diode 464 can be a voltage signal close to 56 V DC, a slightly lower voltage level than nominally injected to current limiter 116. For example, the output of the diode 464 can be within 5% of the voltage level nominally injected to current limiter 116.

The power portion of the second DC power circuit at inductor 411 includes the input to diode 466. Diode 466 is similar to diode 464. The output of diode 466 also includes a voltage signal slightly lower than 56 V DC. For example, the output of the diode 466 can be within 5% of the voltage level nominally injected to current limiter 118. The voltage signals are combined together at the outputs of diodes 464, 466, to a combined voltage signal still at slightly below 56 V (taking into account cable power losses and diode power losses) or approximately equal to (nominal) 56 V. Communication node 400A can now draw power from two circuits simultaneously to use more than 100 W in total while the individual circuits in the Ethernet cable 404 are safely limited to less than 100 W.

The combined voltage signal is inputted to surge protector 168 to suppress any voltage in excess of a pre-set threshold value. Surge protector 168 is configured to clamp voltage surges at a level just below the safe operating limit of the downstream components (e.g., power signature circuit 170 and/or board power converter 172) to protect them against transients or faults. The voltage signal outputted by surge protector 168 is the input to power signature circuit 170.

The combined approximately 56 V is provided to board power converter 172 to properly allocate and distribute power to various components included in node 400A. For example, modem and antenna system 162 is powered by power received from board power converter 172. Each subcomponent of modem and antenna system 162 can have different power requirements from each other and the power requirement for a given subcomponent can vary as a function of time (e.g., a subcomponent is enabled or disabled at different points in time).

Power signature circuit 170 and power controller 124 can apply the detection technique for determining if it is safe to apply 56 V as described above with respect to FIG. 1 above.

A circuit forms a closed loop and accordingly, the start of the return signal path is defined by the board power converter 172 to power signature circuit 170, and then toward inductors 411, 413. The return or output voltage signal splits into each of inductors 411, 413 to be received by inductors 405, 407, respectively, via second lines of twisted pair wires 482, 484, respectively. Inductors 405, 407, in turn, provide return voltages to respective current limiters 120, 122. The outputs of current limiters 120, 122 are combined to be an input to AC-DC converter 114.

The circuits formed by communication node 400A, Ethernet cable 404, and power delivery device 402A have single and dual signal paths at different portions. At a first portion 490 of the circuits, starting with the AC-DC converter 114, a single signal path is defined (e.g., a single voltage signal at 56 V DC outputted by AC-DC converter 114 to each of current limiters 116, 118). At a second portion 492 of the circuits, starting with current limiters 116, 118, dual or parallel signal paths are defined. The two signal paths continue with inductors 401, 403 and to inductors 409, 411, respectively. At a third portion 494 of the circuits, starting with the surge protector 168 to power signature circuit 170 to board power converter 172 and then back to power signature circuit 170, a single signal path is defined. At a fourth portion 496 of the circuits, starting with inductors 413, 415, through second wires of twisted pair wires 482, 482, to inductors 405, 407, and to current limiters 120, 122, dual or parallel signal paths are defined. At a fifth portion 498 of the circuits, the outputs of current limiters 120, 122 are combined into a single signal path to AC-DC converter 114.

In some embodiments, a first DC power circuit is defined from the output of current limiter 116 to diode 464 and the associated return path to power delivery device 402A, which is a current path of a single circuit of less than 100 W. A second DC power circuit is defined from the output of current limiter 118 to diode 466 and the associated return path to power delivery device 402A, which is a current path of another single circuit of less than 100 W. Thus, two circuits, each carrying less than 100 W, supplies a total of more than 100 W to communication node 100.

Because total power to communication node 400A is delivered on two signal paths/lines/circuits (via first wires of twisted pair wires 482, 484 of Ethernet cable 404) from power delivery device 402A, more than 100 W can be safely delivered to the load (communication node 400A) while staying in compliance with the maximum allowed power and DC voltage levels per delivery signal path/line/circuit. This means that the circuitry in communication node 400A, power delivery device 402A, or Ethernet cable 404 is not subject to higher regulatory requirements, such as regulatory requirements associated with power delivery greater than 100 W via a single power delivery path/line/circuit between source and load.

In some embodiments, up to two additional signal paths/lines/circuits utilizing differential power delivery can be provided over third and fourth twisted pair wires 486, 488 while remaining within the scope of the present disclosure. Addition of two additional can double the amount of power that can be safely delivered to the load (communication node 400A) while staying in compliance with the maximum allowed power and DC voltage levels per delivery signal path/line/circuit. It should be understood from the present disclosure that the addition of additional signal paths/lines/circuits can require inclusion of additional inductors, current limiters, surge protectors, diodes, and/or the like.

Figure 4B:
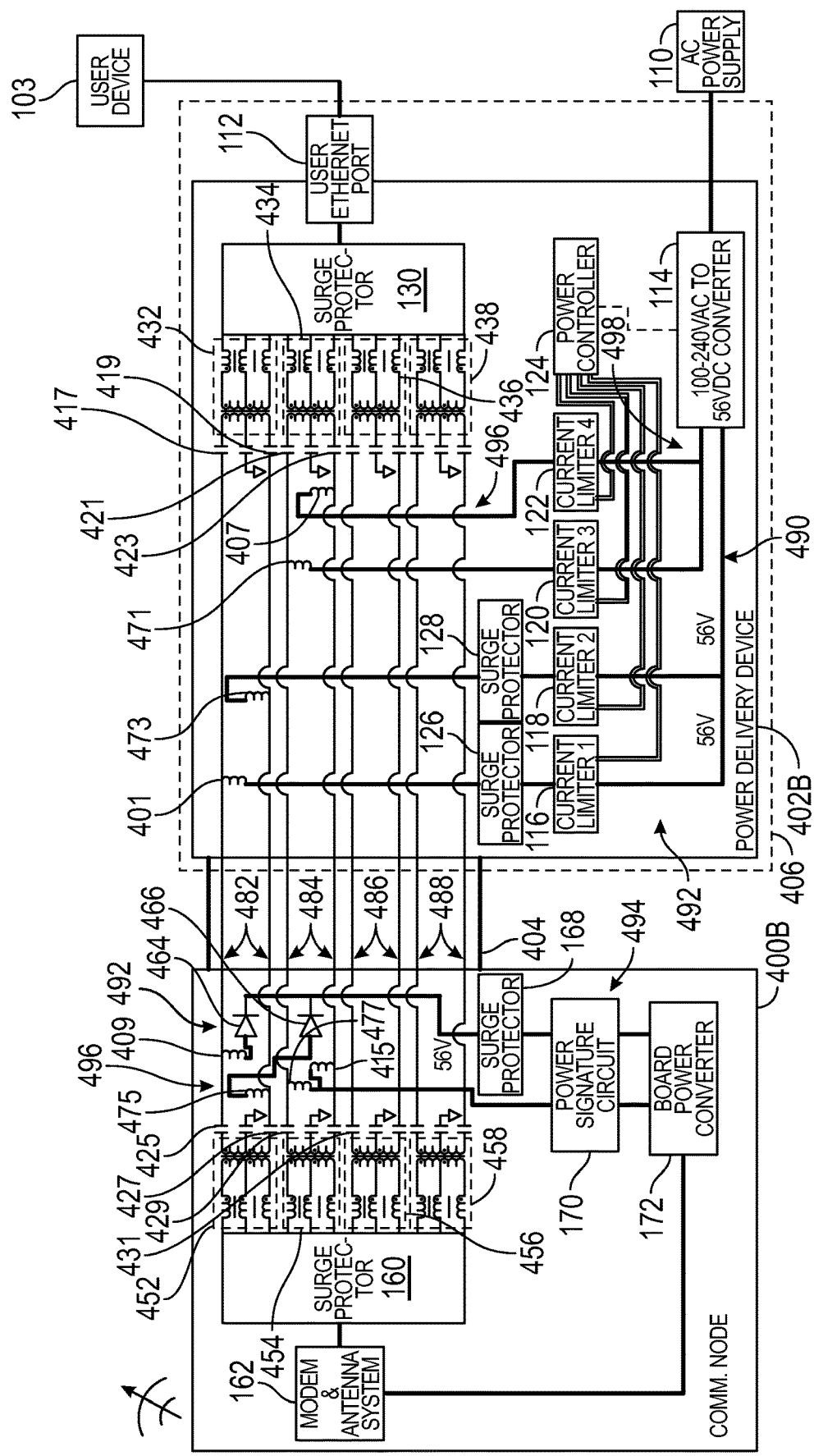
FIG. 4B is an example block diagram illustration of a communication node and associated component(s) included in a communication system in accordance with various aspects of the present disclosure.

FIG. 4B is another example block diagram illustration of a communication node 400B and associated component(s) included in a communication system in accordance with various aspects of the present disclosure. In particular, FIG. 4B illustrates an additional wiring configuration for supplying a DC supply voltage to the communication node 400B. Within the power delivery device 402B, the inductors 403, 405 and their associated connections to surge protector 128, current limiter 120, and wires of the first and second twisted pair wires 482, 484 included in power delivery device 402A of FIG. 4A have been removed. Similarly, within the communication node 400B, inductors 411, 413 and their associated connections to diode 466, and power signature circuit 494 included in the communication node 400A of FIG. 4A have been removed.

Power delivery device 402B includes inductors 471 and 473. Surge protector 128 is electrically disposed between inductor 473 and current limiter 118. Inductor 473 is electrically coupled to the second wire of twisted pair wires 482 of Ethernet cable 404. Current limiter 120 is electrically disposed between inductor 471 and AC-DC converter 114. Inductor 471 is electrically coupled to a second wire of twisted pair wires 482 of Ethernet cable 404.

Communication node 400B includes inductors 475 and 477. Inductor 475 is electrically coupled to the second wire of twisted pair wires 482, and diode 466, in turn, is electrically coupled to surge protector 168. Inductor 477 is electrically coupled to the first wire of twisted pair wires 484. Power signature circuit 170 electrically couples to inductors 477 and 415.

In the configuration of FIG. 4B, the first wire of twisted pair 482 and the first wire of the second twisted pair 484 can act as portions of a signal path and return path, respectively for a first DC power circuit. Similarly, the second wire of twisted pair 482 and the second wire of the twisted pair 484 can act as portions of a signal path and return path, respectively, for a second DC power circuit.

As should be understood from FIGS. 4A and 4B, for twisted pair wires 482, 484, 486, and 488 that are DC isolated relative to one another by isolation capacitors, different combinations of pairs of wires from among the DC isolated twisted pair wires 482, 484, 486, 488 can be used to form a signal path and a return path of a DC power circuit without departing from the scope of the present disclosure.

In some embodiments, prior to start of full power delivery as described above, a check is performed by load detection circuitry as to whether an appropriate communication node, such as communication node 400, is present and properly connected to power delivery device 402. The check describe above with respect to FIG. 1 above can be equally applied to the differential DC power delivery described with respect to FIG. 4A and FIG. 4B.

In some embodiments, the differential power delivery described with respect to FIG. 4A and FIG. 4B and common mode power delivery described with respect to FIG. 1 can be used simultaneously. For example, a common mode power delivery circuit as described with respect to FIG. 1 can be formed with a power delivery path (or signal path) on first twisted pair wires 182/482 and a return path on second twisted pair wires 184/484. In the same example, two differential mode power delivery circuits as described with respect to FIG. 4A and/or FIG. 4B can be formed on third twisted pair wires 186/486 and fourth twisted pair wires 188/488. The resulting configuration can be referred to as hybrid power delivery. The example configuration can result in a total of three signal paths/lines/circuits capable of delivering power from the power delivery device 102/402 to the communication node 100/400. A hybrid configuration is not limited to utilizing first and second twisted pair wires 182/482, 184/484 for the common mode DC power circuit and third and fourth twisted pair wires 186/486, 188/488 for the differential mode DC power circuits. For example, a common mode DC power circuit could be formed on second and third twisted pair wires 184/484, 186/486 with differential mode DC power circuits formed on the remaining first and fourth pairs 182/482, 188/488, or any other combination of pairs. In addition, not all available twisted pair wires need to be utilized for power delivery over multiple circuits, as illustrated in FIG. 4A and FIG. 4B where the third and fourth twisted pair wires 486, 488 do not include any DC power delivery circuitry. It should be understood from the present disclosure that the addition of additional signal paths/lines/circuits can require inclusion of additional inductors, current limiters, surge protectors, diodes, and/or the like.

Although the example block diagrams of FIG. 4A and FIG. 4B describe a DC supply voltage (e.g., 56V) generated by an AC-DC converter with an AC power supply 110 as an input, it should be understood that the DC supply voltage can also be generated by a DC-DC converter (not shown) included within the power delivery device 102 with a DC power supply (e.g., as an alternative to AC power supply 110) as an input without departing from the scope of the present disclosure. In some implementations, the power delivery device 102 may not include a AC-DC converter or DC-DC converter, and the DC supply voltage can be provided to the power delivery device 102 from an external DC power supply.

Figure 5:
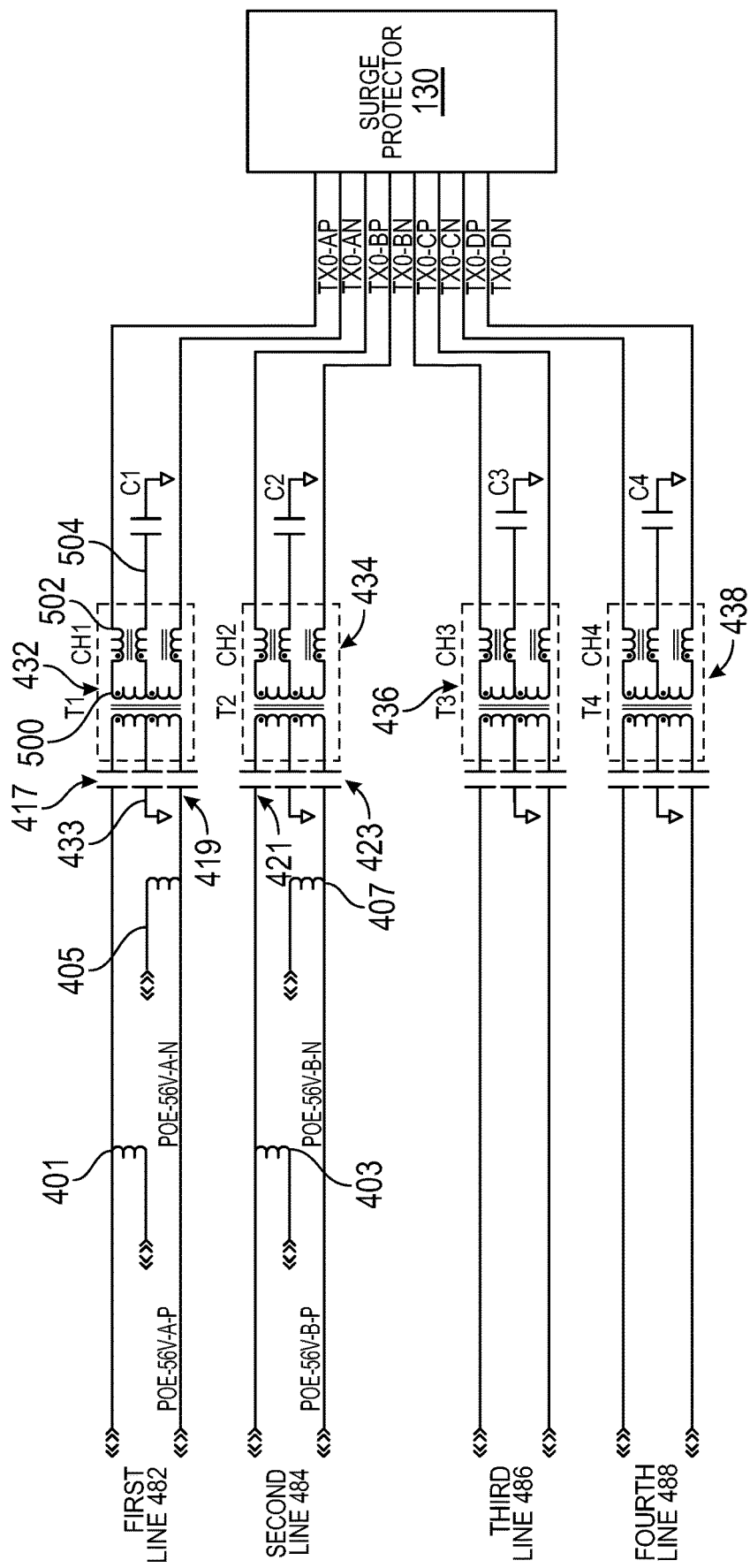
FIG. 5 illustrates at least a portion of a circuit showing details of magnetics included in the power delivery device shown in FIG. 4A in accordance with various aspects of the present disclosure.

FIG. 5 illustrates at least a portion of a circuit showing details of magnetics 432, 434, 436, 438 in accordance with various aspects of the present disclosure. The portion of the circuit shown of FIG. 5 is illustrated with the inductor configuration of inductors 401, 403, 405, 407 associated with power delivery device 402A of FIG. 4A. It should be understood that the configuration of magnetics 432, 434, 436, 438 described below can be used with alternative configurations of inductors such as the inductors 401, 407, 471, 473 shown in FIG. 4B, or the like, without departing from the scope of the present disclosure. Each of magnetics 432, 434, 436, 438 includes high current magnetics. Magnetics 432 includes a transformer 500 electrically coupled to a common mode choke 502. The center tap of the transformer 500 electrically couples to capacitor 433, and then terminates to ground. Common mode choke 502 electrically couples to a capacitor 504, and then terminates to ground.

Common mode choke 502 is configured to filter out or attenuate noise from the data signals. Common mode choke 502 is located on the physical (PHY) side or the side of the transformer 200 furthest from the line side (e.g., first twisted pair wires 482). Common mode choke 502 is located between the data side (from user Ethernet port 112) and transformer 500, rather than between transformer 500 and the line side (first twisted pair wires 482). Thus, magnetics 432 is also referred to as reverse magnetics or reverse configured magnetics.

Transformer 500 includes a transformer having primary windings to secondary windings at a 1:1 ratio. Transformer 200 can include any of the following types of transformer, without limitation, wire coiled on ferrite cores, copper traces wrapped with a ferrite core, and/or the like.

Each of the remaining magnetics 434, 436, 438 and associated components is similar to magnetic 432 and associated components discussed above, except associated with respective second, third, and fourth twisted pair wires 484, 486, 488. Unlike for magnetics 452, 454, there are no bridge diodes (such as diodes 464, 466) associated with magnetics 432, 434. The configuration of magnetics 432, 434, 436, 438 provides lightning protection.

Figure 2:
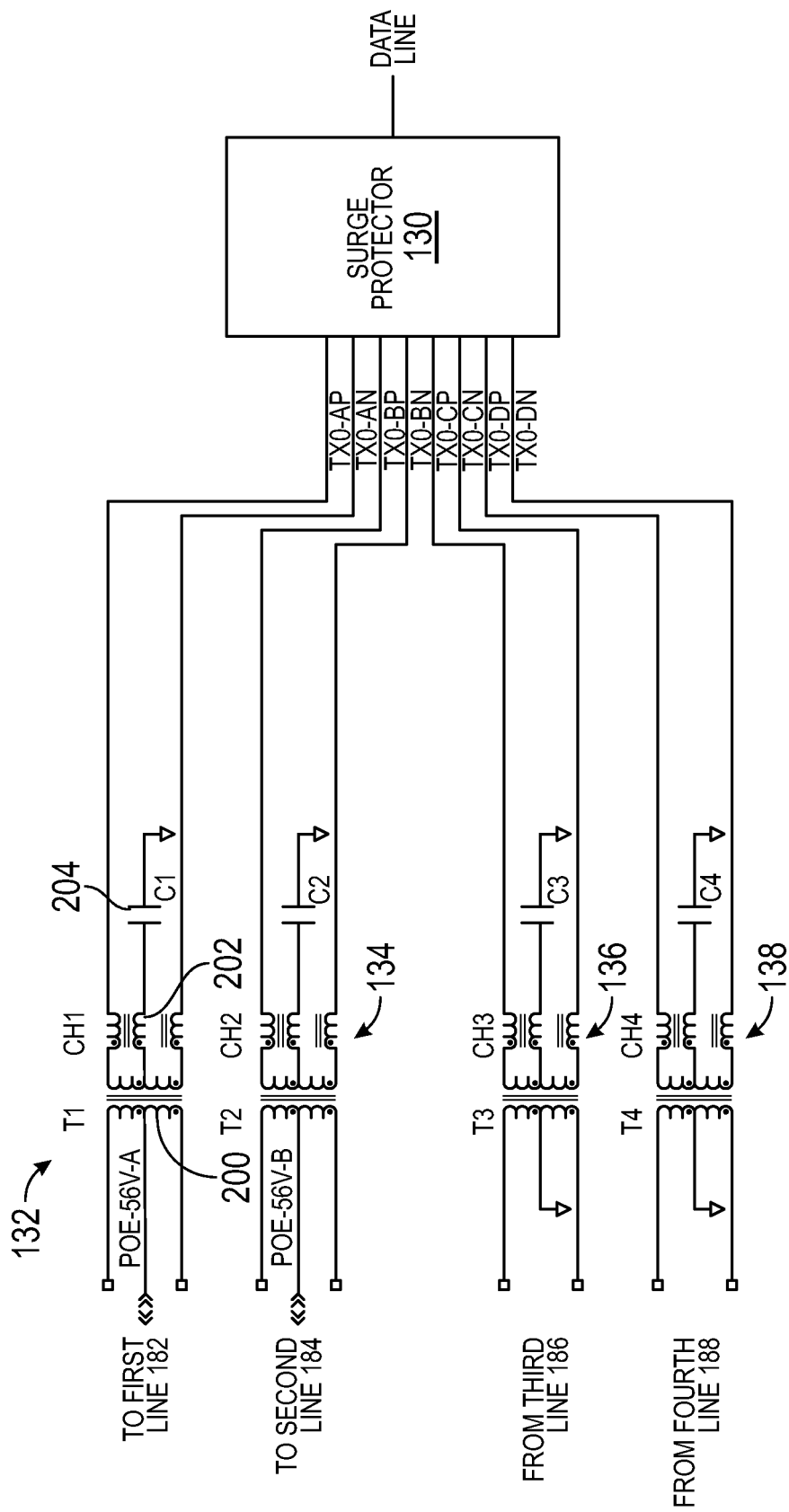
FIG. 2 illustrates at least a portion of a circuit showing details of magnetics included in the power delivery device shown in FIG. 1 in accordance with various aspects of the present disclosure.

Isolation capacitors 417, 419 isolate magnetics 432 from the differential DC voltage carried on first twisted pair wires 482. Similarly, isolation capacitors 421, 423 isolate magnetics 434 from the differential DC voltage carried on second twisted pair wires 484. Magnetics 436 and 438 are similarly isolated from DC voltages by isolation capacitors. The isolation capacitors (not labeled) coupled to magnetics 436 and 438 can prevent a DC current flowing through the third twisted pair wires 486 and the fourth twisted pair wires 488 of the Ethernet cable 404 due to a difference in DC voltage between ends of the Ethernet cable. For example, the isolation capacitors coupled to magnetics 436 and 438 can prevent a DC current flow when the Ethernet cable 404 is connected between buildings where building grounds are at different voltages. Because there is no DC current path from the twisted pair wires 482, 484, 486, 488, the magnetics 432, 434, 436, 438 can optionally be operated in a standard configuration (e.g., with the common mode choke 502 located between the transformer and the line side) without incurring power loss from DC current flowing through the common mode chokes (e.g., choke 502 of magnetics 432) as discussed above with respect to FIGS. 2 and 3. In some cases, Ethernet magnetics that are not rated for high currents and/or have a relatively large DC resistance can be used with the differential DC power delivery technique because no DC current flows through the magnetics.

Capacitors C1 (504), C2, C3, and/or C4 can be optional depending on the bias of the respective pair line, in some embodiments.

Figure 6:
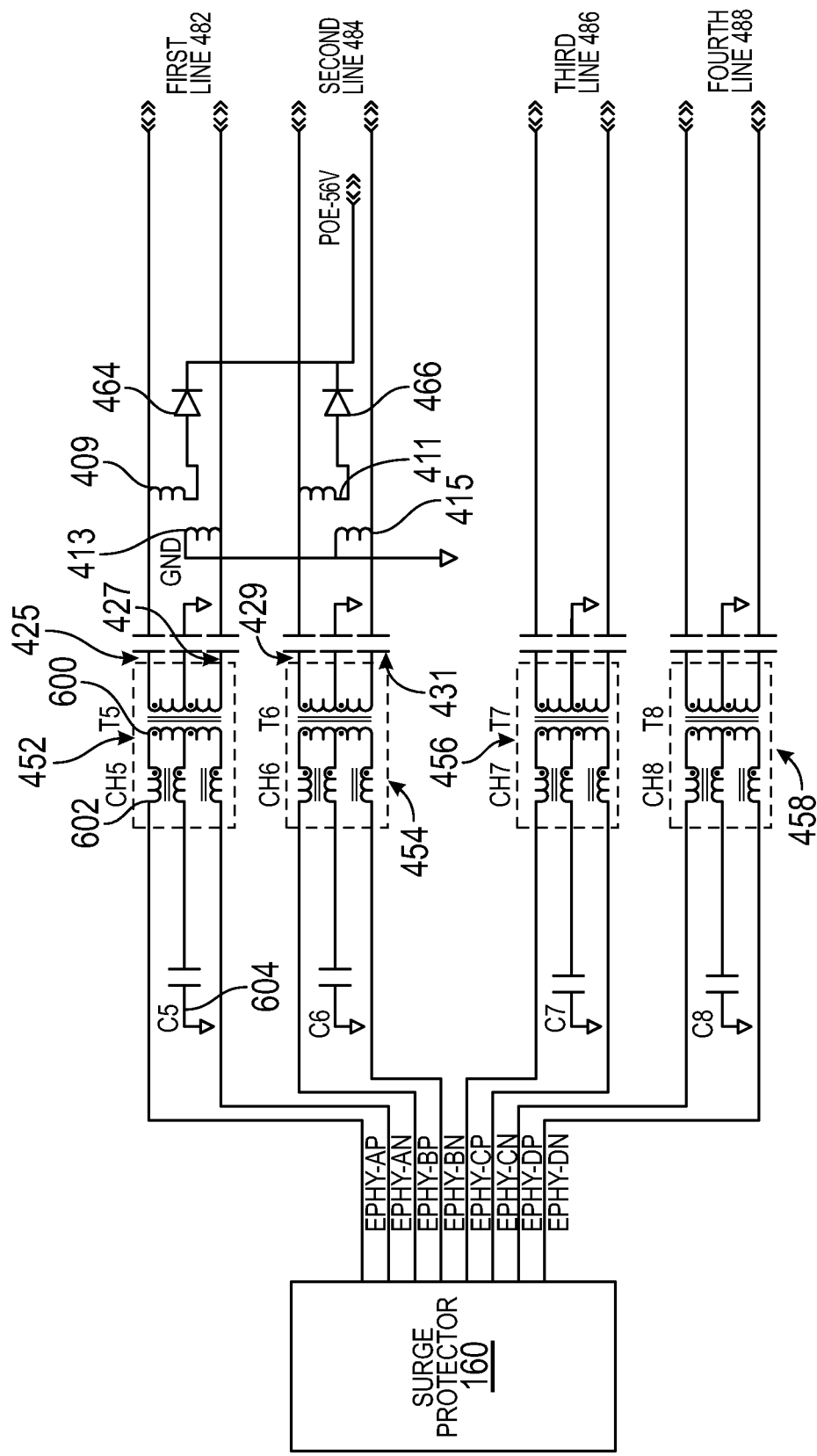
FIG. 6 illustrates at least a portion of a circuit showing details of magnetics included in the communication node shown in FIG. 4A in accordance with various aspects of the present disclosure.

FIG. 6 illustrates at least a portion of a circuit showing details of magnetics 452, 454, 456, 458 in accordance with various aspects of the present disclosure. The portion of the circuit shown of FIG. 6 is illustrated with the inductor configuration of inductors 409, 411, 413, 415 associated with power delivery device 402A of FIG. 4A. It should be understood that the configuration of magnetics 452, 454, 456, 458 described below can be used with alternative configurations of inductors such as the inductors 409, 415, 475, 477 shown in FIG. 4B, or the like, without departing from the scope of the present disclosure. Each of magnetics 452, 454, 456, 458 can be high current magnetics. Magnetics 452 includes a transformer 600 electrically coupled to a common mode choke 602. Common mode choke 602 is configured to filter out or attenuate noise of the data signal. Common mode choke 602 is located on the PHY side or the side of the transformer 600 furthest from the line side (e.g., first twisted pair wires 482). Common mode choke 602 is located between the data side (to modem and antenna system 162) and transformer 600, rather than between transformer 600 and the line side (first twisted pair wires 482). Thus, magnetics 452 is also referred to as reverse magnetics or reverse configured magnetics.

Transformer 600 can be a transformer having primary windings to secondary windings at a 1:1 ratio. Transformer 600 can include any of the following types of transformer, without limitation, wire coiled on ferrite cores, copper traces wrapped with a ferrite core, and/or the like.

Each of the remaining magnetics 454, 456, 458 and associated components is similar to magnetics 452 and associated components discussed above, except associated with respective second, third, and fourth twisted pair wires 484, 486, 488. Magnetics 432, 434, 436, 438 and associated components are also similar to respective magnetics 452, 454, 456, 458. Magnetics 432, 434, 436, 438 and associated components are mirrored or symmetrical about an imaginary plane into the page in FIG. 4 with respect to magnetics 452, 454, 456, 458. Capacitors C5 (604), C6, C7, and/or C8 can be optional depending on the bias of the respective pair line, in some embodiments.

Isolation capacitors 425, 427 isolate magnetics 452 from the differential DC voltage carried on first twisted pair wires 482. Similarly, isolation capacitors 429, 431 isolate magnetics 454 from the differential DC voltage carried on second twisted pair wires 484. Magnetics 456 and 458 are similarly isolated from DC voltages by isolation capacitors. The isolation capacitors coupled to magnetics 456 and 458 (not labeled) can prevent a DC current flowing through the third twisted pair wires 486 and the fourth twisted pair wires 488 of the Ethernet cable 404 due to a difference in DC voltage between ends of the Ethernet cable. For example, the isolation capacitors coupled to magnetics 456 and 458 can prevent a DC current flow when the Ethernet cable 404 is connected between buildings where building grounds are at different voltages. Because there is no DC current path from the twisted pair wires 482, 484, 486, 488, the magnetics 452, 454, 456, 458 can optionally be operated in a standard configuration (e.g., with the common mode choke 602 located between the transformer and the line side) without incurring power loss from DC current flowing through the common mode chokes (e.g., choke 602 of magnetics 452) as discussed above with respect to FIGS. 2 and 3. In some cases, Ethernet magnetics that are not rated for high currents and/or have a relatively large DC resistance can be used with the differential DC power delivery technique because no DC current flows through the magnetics.

The power over Ethernet schemes disclosed herein implement intelligent power delivery that ensures safe power delivery and proactive power shut off protocols for a variety of different operating conditions. One or more voltage loss optimizations are implemented. The number of diodes in the circuit is reduced to reduce voltage loss. In some embodiments, the Ethernet cable 104/404 can have a shorter length (e.g., maximum length of approximately 30-33 meter (m)) rather than upwards of 100 m. A conventional Ethernet cable may not be able to handle the total amount of power delivered by the power delivery device 102/402. The reverse magnetics configuration of the present disclosure facilitates less loss in power delivery since the DC power does not flow through the common mode chokes included in the reverse magnetics.

Surge protection is also included, without limitation, on the Ethernet lines and on the power lines. This facilitates operation outdoors and near potential lightning strikes. Conventional power over Ethernet is incapable of surviving an indirect or nearby lightning strike, or the load and/or source surviving the harsh environment of the outdoors.

Figure 7:
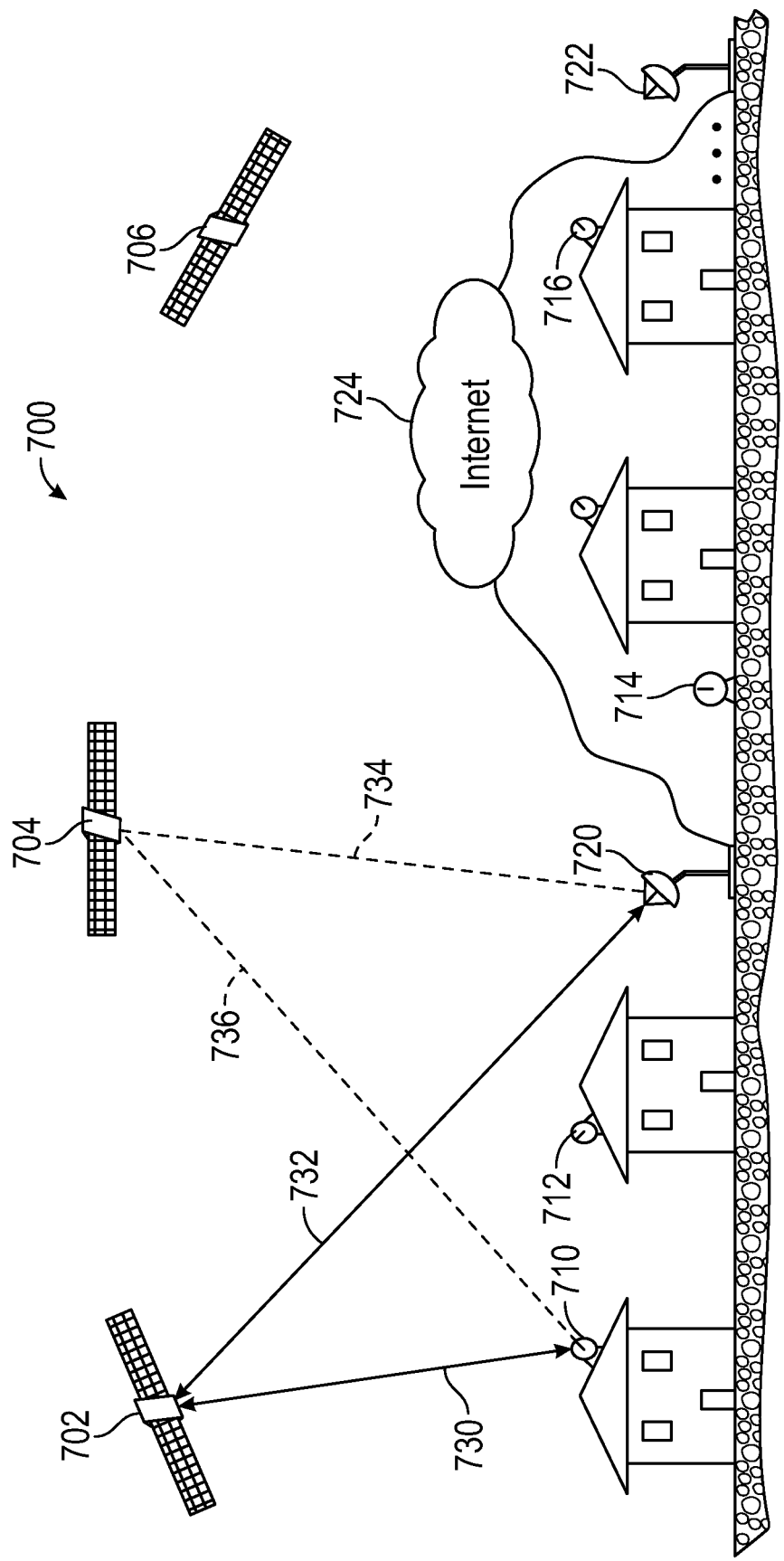
FIG. 7 illustrates a diagram showing an example wireless communication system in accordance with various aspects of the present disclosure.

FIG. 7 illustrates a diagram showing an example wireless communication system 700 in accordance with various aspects of the present disclosure. System 700 includes a satellite-based communication system including a plurality of satellites orbiting Earth in, for example, a non-geostationary orbit (NGO) constellation. It is understood that system 700 can also comprise any of a variety of wireless or wired communication systems such as, but not limited to, a low earth orbiting (LEO) communication system, a non-earth based communication system, a ground-based communication system, a space-based communication system, and/or the like.

Of the plurality of satellites comprising the satellite constellation, at least three satellites of the plurality of satellites (e.g., satellites 702, 704, and 706) are shown in FIG. 7 for illustrative purposes. System 700 further includes ground or Earth based equipment configured to communicate with the plurality of satellites, such equipment including a plurality of user equipment and a plurality of gateways. User equipment 710, 712, 714, and 716 of the plurality of user equipment are shown in FIG. 7.

Communication node 100 can include any of user equipment 710, 712, 714, or 716. Gateways 720, 722 of the plurality of gateways are also shown in FIG. 7. Each of the satellites, user equipment, and gateways within system 700 is also referred to as a node, system node, communication node, and/or the like.

Each user equipment of the plurality of user equipment is associated with a particular user. User equipment is configured to serve as a conduit between the particular user's device(s) and a satellite of the plurality of satellites which is in communication range of the user equipment, such that the particular user's device(s) can have access to a network 724 such as the Internet. Each user equipment is particularly positioned in proximity to the associated user's device(s). For example, user equipment 710, 712, and 716 are located on the respective users' building roof and user equipment 714 is located on a yard of the user's building. A variety of other locations are also contemplated for the user equipment. User equipment may also be referred to as user terminals, end use terminals, end terminals, user ground equipment, and/or the like.

At any given time, a communication link established between a particular satellite and a particular user equipment facilitates access to the network 724 by the user associated with the particular user equipment. One or more user devices (e.g., a smartphone, a tablet, a laptop, an Internet of Things (IoT) device, and/or the like) is in wireless communication with user equipment 710 via WiFi. If, for example, the user requests a web page via a user device, the user device relays the request to user equipment 710. User equipment 710 can establish a communication link 730 to the satellite 702 and transmit the request. Satellite 702, in response, establishes a communication link 732 with an accessible gateway 720 to relay the request. The gateway 720 has wired connections to the network 724. The data associated with rendering the requested web page is returned in the reverse path, from the gateway 720, communication link 732, satellite 702, communication link 730, user equipment 710, and to the originating user device. The requested web page is then rendered on the originating user device.

If satellite 702 moves out of position relative to user equipment 710 before the requested data can be provided to user equipment 710 (or otherwise becomes unavailable), then gateway 720 establishes a communication pathway 734, 736 with a different satellite, such as satellite 704, to provide the requested data.

In some embodiments, one or more gateway of the plurality of gateways includes repeaters (not shown) that lack a wired connection to the network 724. A repeater is configured to relay communications to and/or from a satellite that is a different satellite from the one that directly communicated with a user equipment or gateway. A repeater is configured to be part of the communication pathway between a user equipment and gateway. A repeater may be accessed in cases where a satellite does not have access to a gateway, and thus has to send its communication to another satellite that has access to a gateway via the repeater. Repeaters can be located terrestrially, on water (e.g., on ships or buoys), in airspace below satellite altitudes (e.g., on an airplane or balloon), and/or other Earth-based locations. Accordingly, the plurality of gateways may also be referred to as Earth-based network nodes, Earth-based communication nodes, and/or the like.

In some embodiments, one or more transmitter system and one or more receiver system are included in each user equipment, satellite, and gateway (and repeater) of system 700. If a node includes more than one transmitter system, the respective transmitter systems may be the same or different from each other. More than one receiver system included in a node may similarly be the same or different from each other.

Examples of the devices, systems, and/or methods of various embodiments are provided below. An embodiment of the devices, systems, and/or methods can include any one or more, and any combination of, the examples described below.

Example 1 is an apparatus for power delivery over an Ethernet connection, the apparatus including a source device comprising a first current limiter and a second current limiter in parallel with each other and a first transformer and a second transformer, wherein: a direct current (DC) voltage is provided to each of the first and second current limiters; the first transformer is electrically coupled to an output of the first current limiter; and the second transformer is electrically coupled to an output of the second current limiter; a load device comprising a third transformer and a fourth transformer in parallel with each other; and an Ethernet cable electrically coupled between the source device and the load device, the Ethernet cable comprising first twisted pair lines and second twisted pair lines. The DC voltage is transmitted to the third transformer from the first transformer via the first twisted pair lines simultaneous with the DC voltage being transmitted to the fourth transformer from the second transformer via the second twisted pair lines.

Example 2 includes the subject matter of any one or more of the preceding Examples, and further includes a first common mode choke, a second common mode choke, a third common mode choke, and a fourth common mode choke in series with respectively a first transformer, a second transformer, a third transformer, and a fourth transformer, wherein the first common mode choke is located on a side of the first transformer closer to a data line of the source device than the first twisted pair line, and the third common mode choke is located on a side of the third transformer closer to a data line of the load device than the first twisted pair line.

Example 3 includes the subject matter of any one or more of the preceding Examples, and further includes wherein the DC voltage is 56 Volt (V) DC, or less than or equal to 60 V DC.

Example 4 includes the subject matter of any one or more of the preceding Examples, and further includes wherein each of the source device, the load device, and the Ethernet cable is National Electric Code Class 2 compliant.

Example 5 includes the subject matter of any one or more of the preceding Examples, and further includes wherein a total power delivered by the source device to the load device is greater than 100 Watt (W).

Example 6 includes the subject matter of any one or more of the preceding Examples, and further includes wherein the source device further includes a fifth transformer and a sixth transformer and the load device further includes a seventh transformer and an eighth transformer, the fifth transformer and the seventh transformer including at least a portion of a first return signal path to the voltage source, the sixth transformer and the eight transformers including at least a portion of a second return signal path to the voltage source, and wherein the first return signal path and the second return signal path are parallel to each other.

Example 7 includes the subject matter of any one or more of the preceding Examples, and further includes wherein a power delivery circuit is included in the source and load devices, the power delivery circuit including the DC voltage, the first current limiter and the second current limiter, and the first, the second, the third, and the fourth transformer. Sequentially, a first portion of the power delivery circuit can include a single signal path, a second portion of the power delivery circuit includes dual signal paths, a third portion of the power delivery circuit includes a single signal path, a fourth portion of the power delivery circuit includes dual signal paths, a fifth portion of the power delivery circuit includes a single signal path, and the first portion of the power delivery circuit and the fifth portion of the power delivery circuit electrically couple with each other to form a closed loop.

Example 8 includes the subject matter of any one or more of the preceding Examples, and further includes wherein the dual signal paths include a parallel signal path.

Example 9 includes the subject matter of any one or more of the preceding Examples, and further includes wherein the source device includes a first surge protector electrically coupled between the first current limiter and the first transformer, a second surge protector electrically coupled between the second current limiter and the second transformer, and a third surge protector electrically coupled between a data line and each of the first transformer and the second transformer.

Example 10 includes the subject matter of any one or more of the preceding Examples, and further includes wherein one or more of the first surge protector, the second surge protector, or the third surge protector is configured to provide indirect lightning strike protection.

Example 11 includes the subject matter of any one or more of the preceding Examples, and further includes wherein: the load device includes a first surge protector and second surge protectors and a power converter, outputs of the third transformer and the fourth transformer are combined into a combined voltage, the combined voltage inputted to the first surge protector, and an output of the first surge protector is inputted to the power converter. The power converter can be configured to convert and distribute power to electrical components included in the load device. The second surge protector is electrically coupled between a data line of the load device and each of the third transformer and the fourth transformer. The combined voltage includes a second DC voltage slightly less than the DC voltage or approximately equal to the DC voltage.

Example 12 includes the subject matter of any one or more of the preceding Examples, and further includes wherein at least one or more of the electrical components includes a modem, a transmitter, a receiver, an antenna, or an antenna assembly.

Example 13 includes the subject matter of any one or more of the preceding Examples, and further includes wherein the load device includes a communication node of a communication system associated with a user.

Example 14 includes the subject matter of any one or more of the preceding Examples, and further includes wherein the load device is located outdoors, the source device is located indoors, and the Ethernet cable is partially located indoors and outdoors.

Example 15 includes the subject matter of any one or more of the preceding Examples, and further includes wherein the source device includes a third current limiter and a fourth current limiter included in a return signal path of a power delivery circuit of the source and load devices, and wherein one or more of the first current limiter, the second current limiter, the third current limiter, or the fourth current limiter is configured to detect a return voltage from the load device in response to a detection input voltage injected by the source device.

Example 16 includes the subject matter of any one or more of the preceding Examples, and further includes wherein a particular resistance is applied between the DC voltage and both the first current limiter and the second current limiter prior to injection of the detection input voltage.

Example 17 includes the subject matter of any one or more of the preceding Examples, and further includes wherein the return voltage at a first value is indicative of the load device being a compatible device and properly connected to the source device, wherein each of the first transformer and the second transformer transmits the DC voltage to the load device if the first value is detected, and wherein the particular resistance is removed prior to injection of the DC voltage to the power delivery circuit.

Example 18 includes the subject matter of any one or more of the preceding Examples, and further includes wherein if a return voltage from the load device, in response to injection of the DC voltage, is in excess of a pre-set value, then one or more of the first current limiter, the second current limiter, the third current limiter, or the fourth current limiter is configured to shut off power to the load device.

Example 19 includes the subject matter of any one or more of the preceding Examples, and further includes wherein if a return voltage from the load device, in response to injection of the DC voltage, is below a pre-set value, then one or more of the first current limiter, the second current limiter, the third current limiter, or the fourth current limiter is configured to shut off power to prevent damage to the Ethernet cable.

Example 20 includes the subject matter of any one or more of the preceding Examples, and further includes wherein the Ethernet cable has a maximum length of approximately 30-33 meter (m).

Example 21 includes the subject matter of any one or more of the preceding Examples, and further includes wherein the Ethernet cable has a length between 0.5 m and 100 m.

Example 22 includes the subject matter of any one or more of the preceding Examples, and further includes wherein the source device further comprises an alternating current-direct current (AC-DC) converter configured to output the DC voltage based on an input alternating current (AC) power source.

Example 23 includes the subject matter of any one or more of the preceding Examples, and further includes wherein the source device further comprises a DC-DC configured to output the DC voltage based on an input DC voltage.

Example 24 is a system including a source device comprising a first current limiter and a second current limiter in parallel with each other and a first transformer and a second transformer, wherein: a DC voltage is provided to each of the first current limiter and the second current limiter; the first transformer is electrically coupled to an output of the first current limiter; and the second transformer is electrically coupled to an output of the second current limiter. The system includes a load device including a third transformer and a fourth transformer in parallel with each other, wherein: the third transformer is configured to receive the DC voltage from the first transformer; the fourth transformer is configured to receive the DC voltage from the second transformer; and the DC voltage is selectively supplied to the load device based on a particular value of a second voltage detected by the source device in response to a first voltage supplied by the source device to the load device.

Example 25 includes the subject matter of any one or more of the preceding Examples, and further includes wherein the load device includes a power signature circuit, wherein the DC voltage from each of the third transformer and the fourth transformer is combined into a combined DC voltage that is inputted to the power signature circuit, and wherein the combined DC voltage exceeds a maximum power allowed for a regulatory device class to which the system is compliant.

Example 26 includes the subject matter of any one or more of the preceding Examples, and further includes wherein the DC voltage is 56 Volt (V) or less than or equal to 60 V, a total power associated with the combined DC voltage is greater than 100 Watt (W), and each of the source device and the load device is National Electric Code Class 2 compliant.

Example 27 includes the subject matter of any one or more of the preceding Examples, and further includes an Ethernet cable electrically coupled between the source device and the load device, the Ethernet cable including first twisted pair lines and second twisted pair lines, wherein the DC voltage is transmitted to the third transformer from the first transformer via the first twisted pair lines simultaneous with the DC voltage transmitted to the fourth transformer from the second transformer via the second twisted pair lines.

Example 28 includes the subject matter of any one or more of the preceding Examples, and further includes wherein the source device includes a power controller electrically coupled to each of the first current limiter and the second current limiter and the load device includes a power signature circuit configured to receive a combination of the DC voltage from each of the third transformer and the fourth transformer. The power controller can be configured to control the first current limiter and the second current limiter to apply the first voltage at a high resistance to the load device, and wherein the power signature circuit is configured to return the second voltage to the source device in response to the first voltage, the second voltage indicative of whether to supply the DC voltage to the load device.

Example 29 includes the subject matter of any one or more of the preceding Examples, and further includes wherein if the second voltage and the first voltage have a same voltage value, the second voltage is indicative of an absence of the load device, an improperly connected load device, or an incompatible load device, and the power controller is configured to control the first current limiter and the second current limiter to prevent the DC voltage from being provided to the load device.

Example 30 includes the subject matter of any one or more of the preceding Examples, and further includes wherein if the second voltage is approximately a pre-set portion of the first voltage, the second voltage is indicative of the power signature circuit applying a resistance having a value equal to the high resistance applied by the first current limiter and second current limiter and the load device being a compatible device. The power controller is configured to control the first current limiter and the second current limiter to supply the DC voltage to the load device.

Example 31 includes the subject matter of any one or more of the preceding Examples, and further includes wherein if the second voltage is below a pre-set portion of the first voltage, the second voltage is indicative of an electrical short, and the power controller is configured to control the first current limiter and the second current limiter to prevent the DC voltage from being provided to the load device.

Example 32 includes the subject matter of any one or more of the preceding Examples, and further includes wherein the first current limiter, the first transformer, and the third transformer include at least a portion of a first circuit, and the second current limiter, the second transformer, and the fourth transformer include at least a portion of a second circuit different from the first circuit.

Example 33 is an apparatus for power delivery over an Ethernet connection, the apparatus including a source device including a first current limiter and a second current limiter in parallel with each other and a first inductor and a second inductor, wherein: a DC voltage is provided to each of the first current limiter and the second current limiter; the first inductor is electrically coupled between an output of the first current limiter and a first wire of a plurality of twisted pair wires; and the second inductor is electrically coupled between an output of the second current limiter and a second wire of the plurality of twisted pair wires; a load device including a third inductor coupled to the first wire of the plurality of twisted pair wires and a fourth inductor coupled to the second wire of the plurality of twisted pair wires; and an Ethernet cable electrically coupled between the source device and the load device, the Ethernet cable including the plurality of twisted pair wires, wherein the DC voltage is transmitted to the third inductor from the first inductor via the first wire of the plurality of twisted pair wires simultaneous with the DC voltage being transmitted to the fourth inductor from the second inductor via the second wire of the plurality of twisted pair wires.

Example 34 includes the subject matter of any one or more of the preceding Examples, and further includes wherein the first wire is included in a first twisted pair wires of the plurality of twisted pair wires and the second wire is included in a second twisted pair wires of the plurality of twisted pair wires.

Example 35 includes the subject matter of any one or more of the preceding Examples, and further includes wherein a total power delivered by the source device to the load device is greater than 100 Watt (W).

Example 36 includes the subject matter of any one or more of the preceding Examples, and further includes wherein the first wire and the second wire are included in a first twisted pair wires of the plurality of twisted pair wires.

Example 37 includes the subject matter of any one or more of the preceding Examples, and further includes wherein the DC voltage is 56 Volt (V) DC, or less than or equal to 60 V DC.

Example 38 includes the subject matter of any one or more of the preceding Examples, and further includes wherein the source device includes a third current limiter and a fourth current limiter included in a return signal path of a power delivery circuit of the source and load devices, and wherein one or more of the first current limiter, the second current limiter, the third current limiter, or the fourth current limiter is configured to detect a return voltage from the load device in response to a detection input voltage injected by the source device.

Example 39 includes the subject matter of any one or more of the preceding Examples, and further includes wherein a particular resistance is applied between the DC voltage and the first current limiter and the second current limiters prior to injection of the detection input voltage.

Example 40 includes the subject matter of any one or more of the preceding Examples, and further includes wherein the return voltage at a first value is indicative of the load device being a compatible device and properly connected to the source device, wherein the first inductor transmits the DC voltage to the load device if the first value is detected, and wherein the particular resistance is removed prior to injection of the DC voltage to the power delivery circuit.

Example 41 includes the subject matter of any one or more of the preceding Examples, and further includes wherein if a return voltage from the load device, in response to dual injection of the DC voltage, is in excess of a pre-set value, then one or more of the first current limiter, the second current limiter, the third current limiter, or the fourth current limiter is configured to shut off power to the load device.

Example 42 includes the subject matter of any one or more of the preceding Examples, and further includes wherein if a return voltage from the load device, in response to injection of the DC voltage, is below a pre-set value, then one or more of the first current limiter, the second current limiter, the third current limiter, or the fourth current limiter is configured to shut off power to prevent damage to the Ethernet cable.

Example 43 includes the subject matter of any one or more of the preceding Examples, and further includes wherein: the source device further includes a third current limiter in parallel with the first current limiter and the second current limiter, and a first transformer, the DC voltage is provided to the third current limiter and the transformer is electrically coupled to an output of the third current limiter; the load device further comprises a second transformer; and the Ethernet cable further includes third twisted pair wires of the plurality of twisted pair wires, wherein the DC voltage is transmitted to the second transformer from the first transformer via the third twisted pair wires simultaneous with the DC voltage being transmitted to the third inductor from the first inductor via the first wire of the plurality of twisted pair wires and the DC voltage being transmitted to the fourth inductor from the second inductor via the second wire of the plurality of twisted pair wires.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

What is claimed is:

1. A power delivery system comprising:
a first current limiter and a second current limiter in parallel with each other, wherein a direct current (DC) voltage is provided to each of the first current limiter and the second current limiter;
a first transformer electrically coupled to the first current limiter, the first transformer associated with a first return current path;
a second transformer electrically coupled to the second current limiter, the second transformer associated with a second return current path, the second return current path being different from the first current path;
first differential signal traces electrically coupled to the first transformer; and
second differential signal traces electrically coupled to the second transformer, wherein the DC voltage is transmitted from the first transformer to the first differential signal traces simultaneous with the DC voltage being transmitted to the second differential signal traces by the second transformer.

2. The power delivery system of claim 1, further comprising:
a power control circuit configured to inject a detection input voltage to at least one or more of the first current limiter or the second current limiter;
a third transformer electrically coupled to third differential signal traces, the third transformer associated with the first return current path; and
a voltage detection circuit configured to detect a return voltage from the return current path during injection of the detection input voltage by the power control circuit.

3. The power delivery system of claim 2, further comprising a fourth transformer electrically coupled to fourth differential signal traces and an additional return current path.

4. The power delivery system of claim 3, wherein the return current path and the additional return current path are electrically coupled.

5. The power delivery system of claim 2, wherein a reference resistance is applied between the power control circuit and the first current limiter or the second current limiter prior to injection of the detection input voltage.

6. The power delivery system of claim 5, wherein the return voltage at a first value is indicative of a load device connection, wherein each of the first transformer and the second transformer transmits the DC voltage if the first value is detected, and wherein the reference resistance is removed prior to injection of the DC voltage.

7. The power delivery system of claim 6, wherein if the return voltage, in response to injection of the DC voltage, is in excess of a pre-set value, then one or more of the first current limiter or the second current limiter is configured to shut off power.

8. The power delivery system of claim 6, wherein if the return voltage, in response to injection of the DC voltage, is below a pre-set value, then one or more of the first current limiter or the second current limiter is configured to shut off power.

9. The power delivery system of claim 1, further comprising a first surge protector electrically coupled between the first current limiter and the first transformer and a second surge protector electrically coupled between the second current limiter and the second transformer.

10. An apparatus for power delivery over an Ethernet connection, the apparatus comprising:
a first current limiter and a second current limiter in parallel with each other and a first inductor and a second inductor, wherein:
a DC voltage is provided to the first current limiter and the second current limiter;
the first inductor is electrically coupled between an output of the first current limiter and a first wire of a plurality of twisted pair wires;
the second inductor is electrically coupled between an output of the second current limiter and a second wire of the plurality of twisted pair wires;
a third inductor is electrically coupled to a third wire of the plurality of twisted pair wires;
a fourth inductor is electrically coupled to a fourth wire of the plurality of twisted pair wires; and
the DC voltage is transmitted via a first current path comprising the first wire of the plurality of twisted pair wires and the third wire of the plurality of twisted pair wires simultaneous with the DC voltage being transmitted via a second current path comprising the second wire of the plurality of twisted pair wires and the fourth wire of the plurality of twisted pair wires, the first current path being different from the second current path.

11. A power source device comprising:
a DC voltage;
a first current limiter and a second current limiter in parallel with each other;
a third current limiter and a fourth current limiter in parallel with each other;
a first transformer electrically coupled to first differential traces;
a second transformer electrically coupled to second differential traces;
a first inductor electrically connected between the first current limiter and a first trace of the first differential traces;
a second inductor electrically connected between the second current limiter and a first trace of the second differential traces;
a third inductor electrically connected between the third current limiter and a second trace of the first differential traces; and
a fourth inductor electrically connected between the fourth current limiter and a second trace of the second differential traces.

12. The power source device of claim 11, further comprising an alternating current (AC) to DC converter, wherein an AC voltage is input to the AC to DC converter and the DC voltage is output from the AC to DC converter.

13. The power source device of claim 11, wherein the DC voltage is supplied by a DC power supply external to the power source device or the DC voltage is generated by a DC to DC converter based on an additional DC voltage supplied to the power source device.

14. The power source device of claim 11, wherein the first current limiter and the first transformer comprise at least a portion of a first circuit, and the second current limiter and the second transformer comprise at least a portion of a second circuit different from the first circuit.

15. The power source device of claim 11, further comprising:
a power control circuit configured to inject a detection input voltage to at least one or more of the first current limiter or the second current limiter;
a third transformer electrically coupled to third differential signal traces and a return current path; and
a voltage detection circuit configured to detect a return voltage from the return current path during injection of the detection input voltage by the power control circuit.

16. The power source device of claim 15, further comprising a fourth transformer electrically coupled to fourth differential signal traces and an additional return current path.

17. The power source device of claim 16, wherein a reference resistance is applied between the power control circuit and the first current limiter or the second current limiter prior to injection of the detection input voltage.

18. The power source device of claim 17, wherein the return voltage at a first value is indicative of a load device connection, wherein each of the first transformer and the second transformer transmits the DC voltage if the first value is detected, and wherein the reference resistance is removed prior to injection of the DC voltage.

19. The power delivery system of claim 1, wherein an AC voltage is input to an AC to DC converter and the DC voltage is output from the AC to DC converter, the DC voltage is supplied by a DC power supply external to the power delivery system, or the DC voltage is output by a DC to DC converter based on an additional DC voltage supplied to the power delivery system.

* * * * *